United States Patent

[11] 3,601,906

[72] Inventor John L. Roche
St. Paul, Minn.
[21] Appl. No. 798,016
[22] Filed Feb. 10, 1969
[45] Patented Aug. 31, 1971
[73] Assignee Minnesota Mining and Manufacturing Company
St. Paul, Minn.

[54] TEST GRADING DEVICE
21 Claims, 27 Drawing Figs.

[52] U.S. Cl. ................................................... 35/48 R
[51] Int. Cl. ................................................... G09b 7/00
[50] Field of Search ....................................... 35/48, 8, 9

[56] References Cited
UNITED STATES PATENTS

| | | | |
|---|---|---|---|
| 3,216,132 | 11/1965 | Flaherty et al. | 35/48.2 |
| 3,284,929 | 11/1966 | Azure, Jr. | 35/48.2 |
| 3,410,990 | 11/1968 | Flaherty | 35/48.2 |
| 3,487,560 | 1/1970 | Hassfurther et al. | 35/48.2 |
| 3,487,561 | 1/1970 | Azure, Jr. et al. | 35/48.2 |
| 3,212,203 | 10/1965 | Atkinson | 35/48 B |

*Primary Examiner*—Robert W. Michell
*Assistant Examiner*—J. H. Wolff
*Attorney*—Kinney, Alexander, Sell, Steldt and Delahunt ABSTRACT: A test grading device in which movable sensors scan the corresponding answer indication areas of stationary answer sheets and an answer key; marking pens place marks on the answer sheet in the vicinity of the answer indication areas as to which the student's answer indication disagrees with the answer indication in the corresponding answer indication areas of the answer key; a counting wheel steps in response to such disagreements; and the counting wheel count is printed on the answer sheet. In response to the scanning sensors' repetitious movement across a stack of answer sheets, the counting wheel is reset before any answer indication areas of the answer sheet are scanned; feed legs for separately removing each scored answer sheet are cocked; the marking pen and counting wheel are enabled for each question following the completion of the scanning of the answer indication areas for the question; the sensors are reset prior to scanning the answer indication areas of each question; the marking pens mark the answer sheet; the score is printed on the answer sheet and the feed legs are released to remove the scored answer sheet from the test grading device. The feed legs remove only the top answer sheet from the stack by exerting through gripping pads a gripping force on the top answer sheet which force increases in response to feed leg movement until the top answer sheet is torn from a holding pin and then relaxes upon release of the top answer sheet from the holding pin. In a preferred embodiment, each sensor includes a photocell connected to the gate of an SCR reverse blocking triode thyristor. In this embodiment a reed switch with its coil connected between the anodes of corresponding SCRs closes to enable the marking pens and counting wheel when only one photocell of a corresponding pair senses a darkened answer indication area.

PATENTED AUG 31 1971
3,601,906
SHEET 1 OF 7
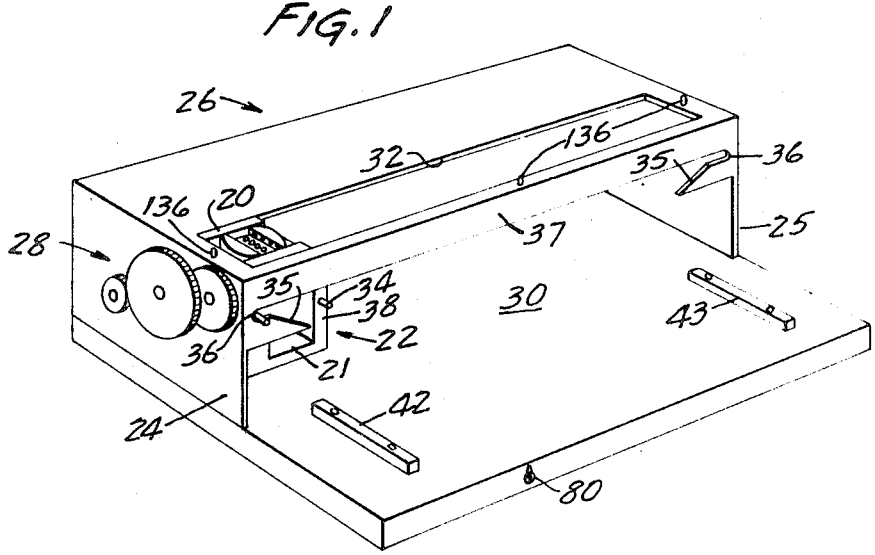
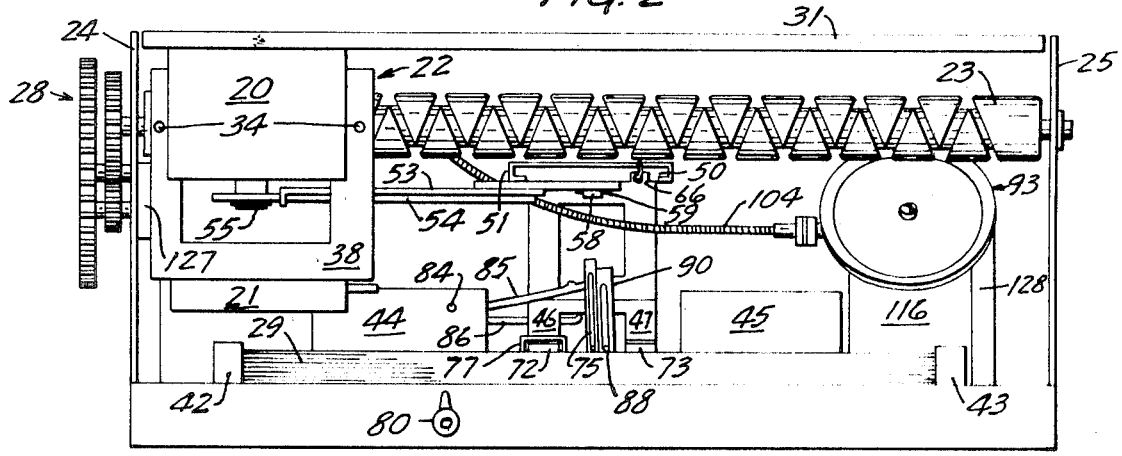
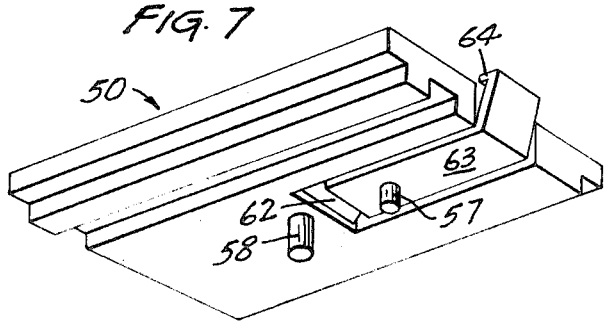
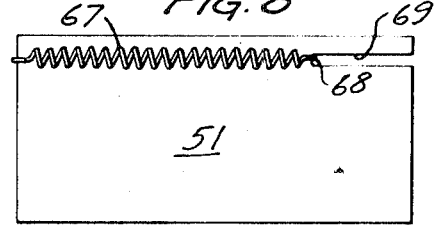
INVENTOR.
JOHN L. ROCHE
BY Kinney, Alexander,
Sell, Steldt & DeLaHunt
ATTORNEYS INVENTOR.
JOHN L. ROCHE
BY Kinney, Alexander,
Sell, Steldt & De La Hunt
ATTORNEYS INVENTOR.
JOHN L. ROCHE
BY Kinney, Alexander
Sell, Steldt & DeLaHunt
ATTORNEYS

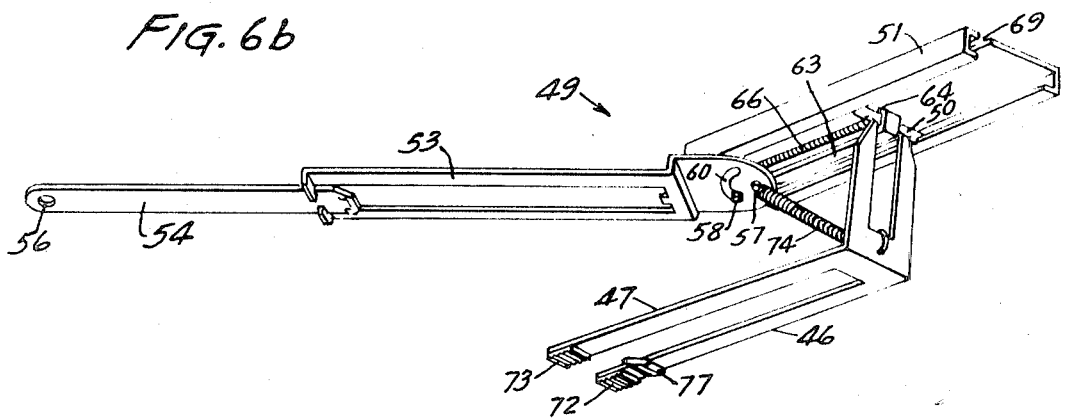
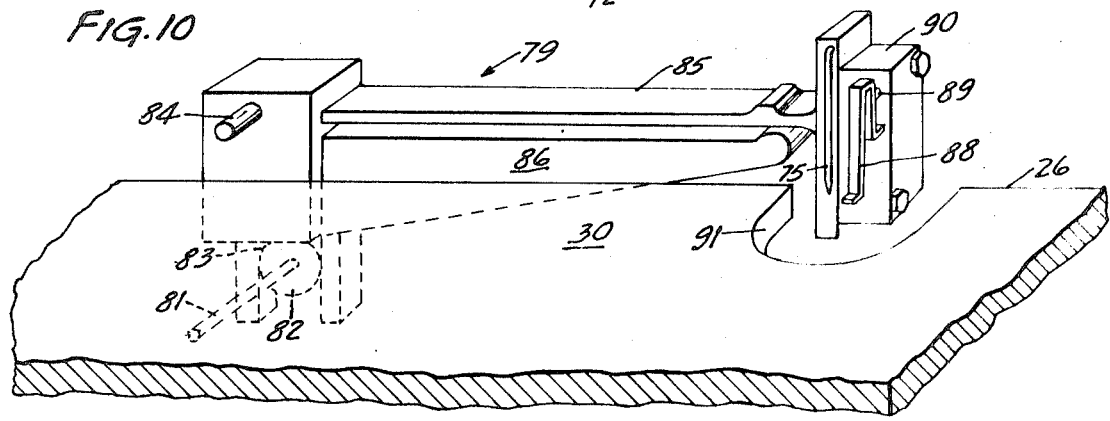
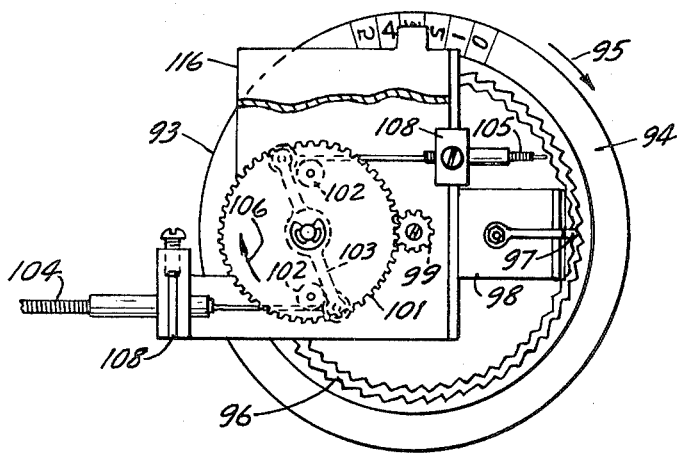
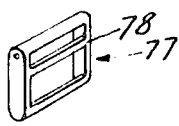
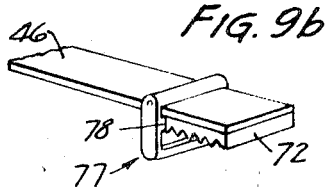
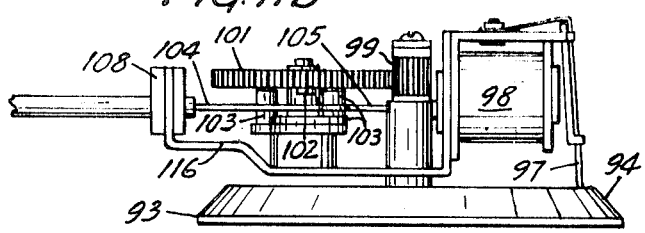

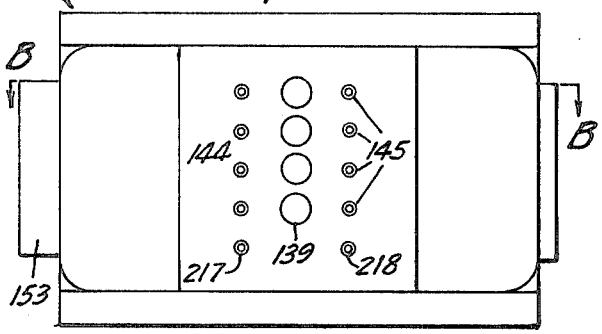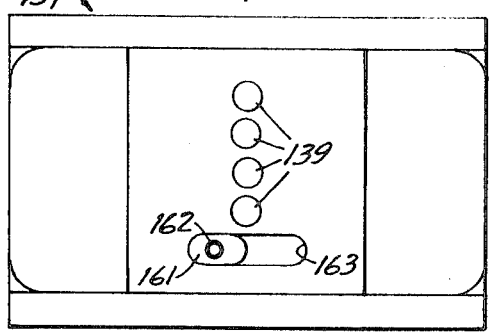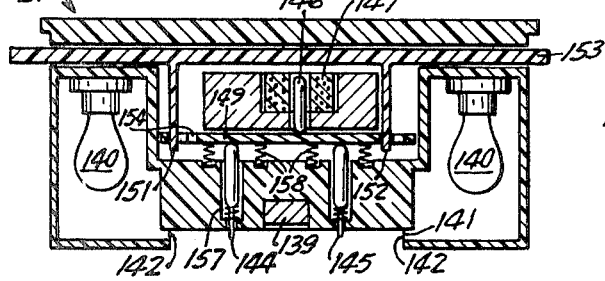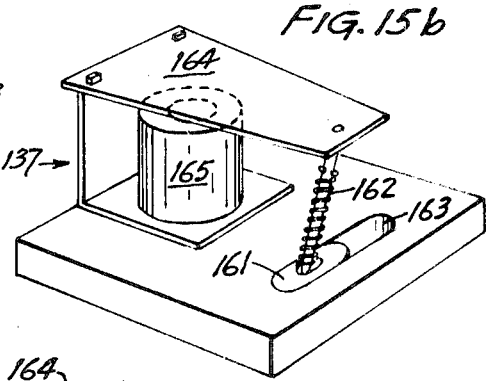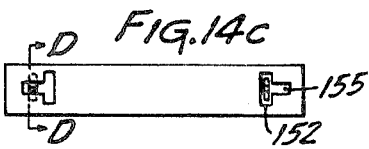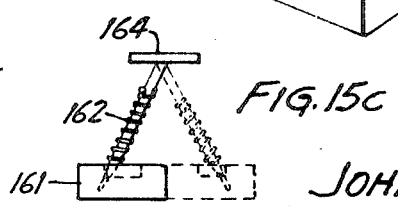

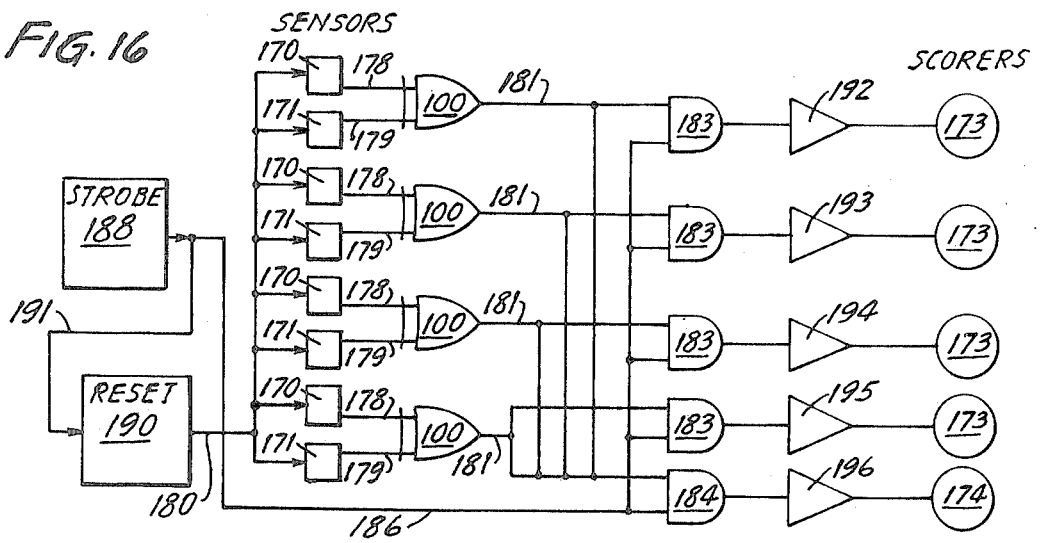
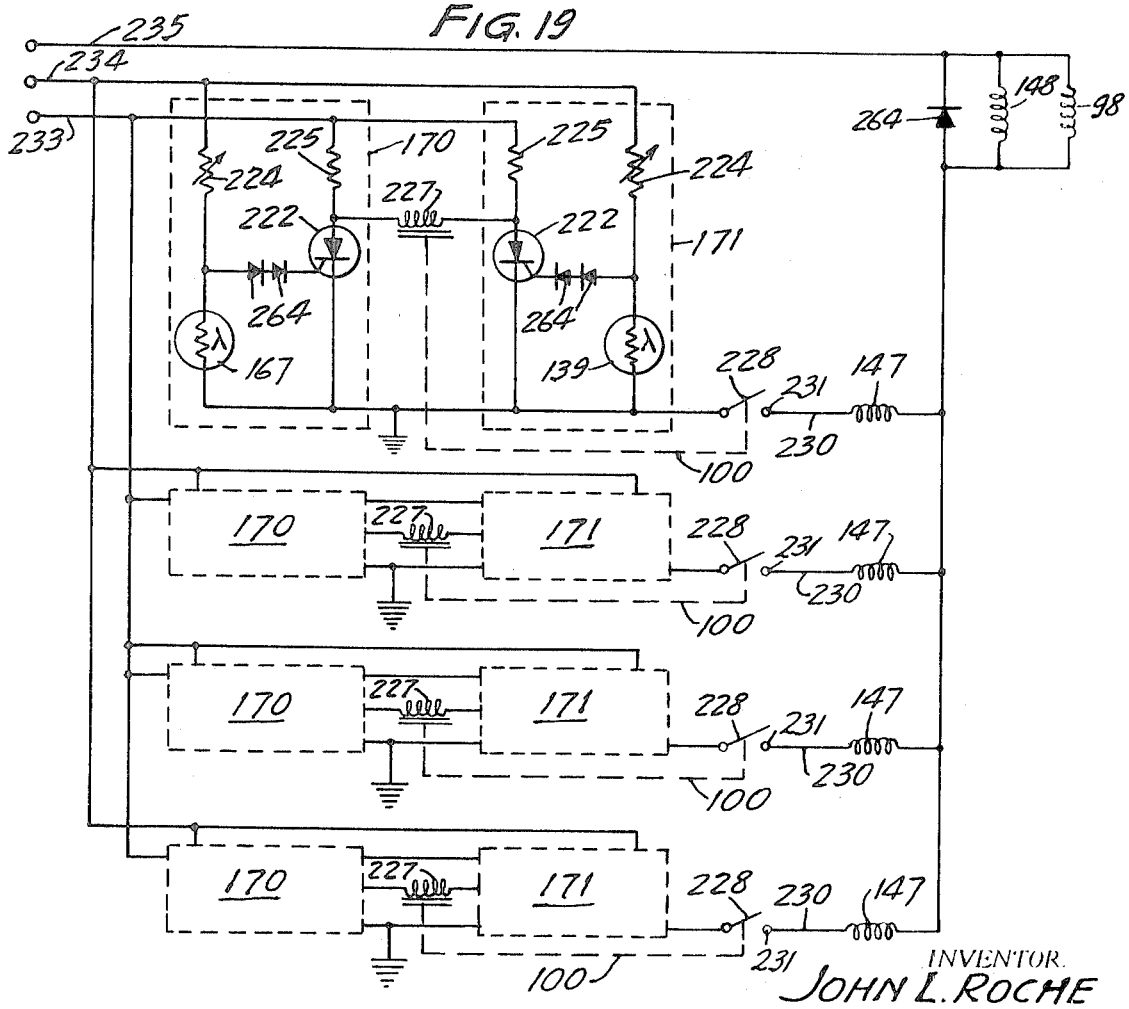

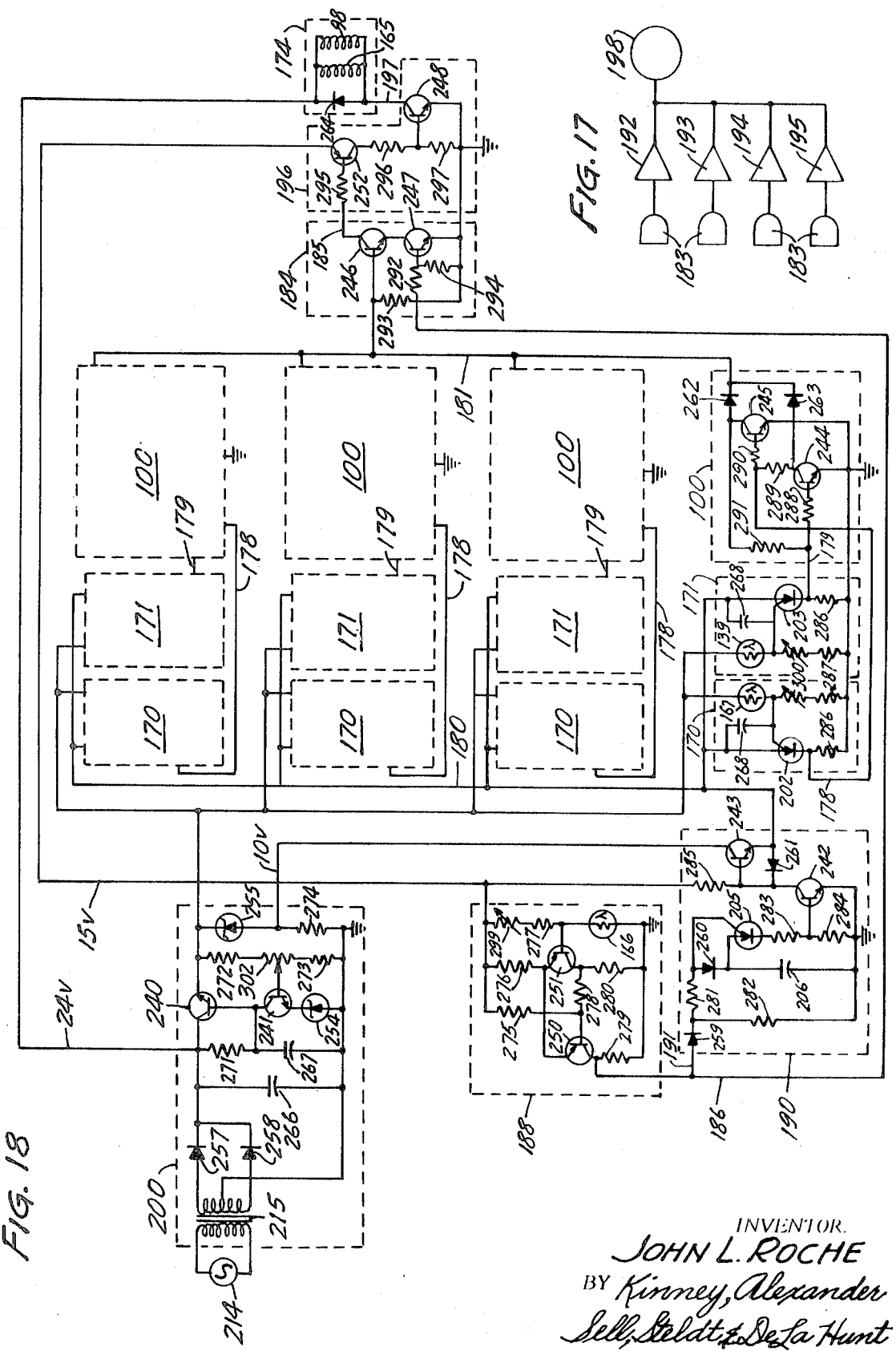

3,601,906

TEST GRADING DEVICE

CROSS-REFERENCE TO RELATED APPLICATION

This application is related to the copending application filed by Donald E. Albright on June 2, 1969, Ser. No. 829,357.

BACKGROUND OF THE INVENTION

This invention pertains to test grading devices for use in scoring multiple choice type questions.

Ideally, the test grading device should provide a numerical indication of the student's achievement, preferably by printing the score on the answer sheet. It is also desirably for the device to place a mark on the answer sheet to separately indicate those questions incorrectly answered. It is furthermore desirable to place a mark in answer indication areas of questions not correctly answered in order to inform the student of the correct answer selection.

It is additionally desirably for the device to be cheatproof. Students should not be able to fool the test grading device by placing indicia in a number of answer indication areas either in excess of or short of the correct number of answer indication areas to be so indicated for each question.

Test grading devices should also be automatic so that they need not be attended during the grading of a number of answer sheets. They should also be of such construction that a slight tolerance may be allowed in alignment of the answer sheets and in the location and intensity of the answer indication made by the student.

Still another desirable feature is that the test grading device be able to cope with the type of multiple choice test wherein there may be provided a variable number of correct answers for each question (sometimes referred to as a "multiple-multiple choice" test).

Test grading devices essentially provide an indication of the student's achievement. Some test grading devices provide a visual indication of the student's numerical score, either on a meter or counter or by printing it on the answer sheet. Other test grading devices provide a light in lamps on a panel or marks on the answer sheet to indicate those questions not correctly answered or provide marks in answer indication areas of the answer sheet for the questions the student has failed to correctly answer to indicate the correct answer selections to the student.

Test grading devices in common necessarily provide for sensing the answer indications from the student's answer sheet and for sensing the correct answers to the corresponding questions from some type of answer key. The scoring of the test paper is provided in response to a comparison of the combinations of answer indications sensed from corresponding areas of the answer sheet and the answer key.

It is in the nature of the scoring response provided by comparing the sensed combinations that test grading devices differ. Some test grading devices provide a comparison response to every incorrectly answered question and others to every correctly answered question. More basically, the comparison responses in some devices may indicate the presence or absence of indicia in the answer indication areas of the answer sheet which correctly should contain indicia and in other devices may indicate the presence or absence of indicia in the answer indication areas of the answer sheet, which correctly should not contain indicia.

These devices have limitations, however, and do not individually provide all of the aforementioned desirable features nor do they provide the versatility of performance demanded by many teachers. For example, the "multiple-multiple choice" test presents additional comparison response requirements. When only one answer indication area should contain indicia, a comparison response can be derived by simply sensing whether the answer sheet contains an indicia in the answer indication area corresponding to the correct answer for each question, or by alternatively sensing whether any indicia have been placed in any answer indication area not corresponding to the correct answer. Where there are a variable number of possible correct answers, a comparison response indicating whether the answer sheet contains an indication in answer indication areas corresponding to the correct answers may be misleading when the student has placed indicia in a plurality of answer indication areas including all of the areas corresponding to correct answers, but also in excess thereof, especially when it is desired in scoring the test to give the student credit for each correct choice, whether his choice be the placing of an indicia on the paper or intentionally not placing an indicia on the paper. Likewise a scoring response indicating whether indicia have been placed in answer indication areas not corresponding to correct answers may be misleading when the only indicia placed on the answer sheet by the student are correct but he in fact leaves blank some indication areas which should be marked.

In U.S. Pat. No. 3,216,132 to Flaherty et al., it is said that the test grading device described therein provides comparison responses which indicate whether the student correctly answered the question or failed to do so by either not placing an indicia in the answer indication area corresponding to correct answers or by placing indicia in the answer indication areas not corresponding to correct answers. In one embodiment of the device described in Flaherty et al. it is suggested that the answer sheet could be first scanned and compared with a first answer key to provide a scoring response to whether the answer sheet contain indicia in the answer indication area corresponding to the correct answers and then scanned and compared with a second answer key to provide a scoring response to whether indicia have been placed in the answer indication areas not corresponding to correct answers. Obviously such a device by requiring multiple scanning of the answer sheet and multiple keys would necessarily be larger than or would be slower than a device which scanned the answer sheet and answer key only once.

Flaherty et al. also describe another embodiment of their device which in a single scan provides responses indicating whether the answer indication areas of the answer sheet contain (1) correctly placed indicia, (2) incorrectly placed indicia, (3) a correct absence of an indicia and (4) the incorrect absence of an indicia. The comparison response is an analog response to the quantity of light passing through the marked or unmarked answer indication area on the answer sheet which is superimposed over an answer key having answer indication areas having apertures of two different sizes corresponding to correct or incorrect answers. The response levels are dependent upon the type of paper, the type of pencil and how extensively the student places indicia in the answer indication areas, factors which limit the utility, complexity and reliability of the device. Furthermore, the analog response levels provided are such that correctly placed indicia and the correct absence of indicia are said by Flaherty et al. to provide a response at a given level whereas incorrectly placed indicia provide response at a lower level and the incorrect absence of indicia provides a response at a higher level. Such an analog response, in addition to being less reliable than a binary digital response, necessitates considerable additional elements so that uniform indications may be provided to the elements which count, print or mark to score the answer sheet. Additional elements are required because the common threshold sensitive responsive elements used to actuate scoring elements in response to the comparison of the answer sheet and answer key are not readily adaptable to respond in one manner to a signal having a given level and to respond in a second manner to that signal having levels both higher or lower than the given level. A uniform response to each sensed disagreement between corresponding pairs of answer sheet and answer key indication areas is certainly preferred.

The prior art test grading devices also contain certain inherent shortcomings in combining the desirable features of automatism and versatility. Many prior art devices do not provide for automatically grading a plurality of answer sheets without attendance. Many provide only an indication of correctness on a meter, dial, or panel from which the teacher is compelled to copy the score and do not imprint the answer sheet with the score or provide scoring marks in the answer indication areas or question areas to indicate what the correct answers are or which questions were incorrectly answered.

For a test grading device to be automatic, provision must be made for feeding or removing the answer sheets past or from the sensing means. Also, each of the feeding or removal, sensing, and scoring means must be reset automatically following each of their separate operations.

The test grading devices of the prior art are generally of two types. In one, the answer sheets are fed past the sensing means. In the other, the sensing means scan across a stationary answer sheet.

The prior art discloses combinations wherein the operation of means for feeding answer sheets past the sensing means is coordinated with actuation of the sensing means. However, such combinations require additional elements to precisely align the answer sheets in relation to the sensing means and to synchronize the sensing of the answer sheet with the sensing of the answer key.

A test grading device in which the sensing means simultaneously scan a stationary answer sheet and answer key simplifies the problems of answer sheet and sensing means alignment and synchronization. In a stationary answer sheet device the answer sheet is moved from an initially synchronized position only after being graded. Therefore, the precise feed speed and positioning of the answer sheet by the sheet feeding device is not as critical to reliable scoring.

Test grading devices combined with sheet feeding devices also must be coordinated with means for placing scoring marks in the answer indication areas and means for printing the score so that the scoring marks appear in the areas of the questions to which they pertain and so that the score is printed on the answer sheet following completion of all answer indication area sensing, but before the answer sheet is fed past or away from the printing means. In a device which grades a moving answer sheet, coordination of the speed and position of the answer sheet with the marking and printing means of the test grading device are critical. Again, these problems may be considerably reduced in a stationary answer sheet device. A disadvantage of some prior art sheet feeding devices is that they have difficulty in feeding only a single sheet from a stack at a time without disturbing the position of the sheets remaining in the stack.

Known prior art devices which provide for scanning a stationary answer sheet do not provide a movement which both scans the sensing means across the answer sheet and operates a sheet feeding device to both remove graded answer sheets from a stack and reset the removal means while continuously scanning the sensing means back and forth across the answer sheet stack until the last sheet is removed therefrom.

Ideally, the test grading device should continuously scan the sensing means back and forth across a stack of stationary answer sheets initially aligned to be synchronously sensed with the answer key, and should also provide for the scanning movement to actuate the removal of graded answer sheets, the resetting of the removal means, the placing of scoring marks in the areas of the questions when appropriate, and the printing of the score on the answer sheet following sensing of all questions of the answer sheet. Such a system would provide reliable operation, not withstanding slight variations in the speed of the scanning movement or in the speed or position imparted on the answer sheet by removal means. Scanning speed must be necessarily limited so as not to exceed an upper limit consistent with the response times of the sensing, comparison and scoring means.

Because alignment of the answer sheets in relation to the sensing means and the answer key must be maintained within tolerance, the operation of the removal means and the resetting thereof should not disturb the aligned answer sheets remaining in the stack.

To provide further reliability, notwithstanding the fact that answer indication areas are not always uniformly aligned on all answer sheets, that answer sheets are not always uniformly aligned in the test grading device, that test grading devices are constructed to within mechanical tolerances, and that the indicia placed by the students within the answer indication areas are not of uniform intensity, size, or position, the scoring response of the marking or counting means should be delayed for each question until after the entirety of each answer indication area of both the answer sheet and the answer key for the question has been scanned.

Also the automatic test grading device should automatically turn itself off following the scoring of all answer sheets.

In the prior art the scoring means typically contain solenoids through which a current must flow to effect actuation of the scoring means. This current is produced in response to a signal from the comparison circuit. Because the active elements of the sensing and comparison circuits generally have maximum current ratings which are considerably lower than the operating current for the solenoids generally used in scoring means, it is necessary to amplify the output signal of the comparison circuit in order to actuate the scoring means. The amplifying circuits add to the complexity of the test grading device. It is therefore preferable that the sensing and/or comparison means provide an output signal having a level of sufficient magnitude to actuate the scoring means without the necessity of intermediate current amplification.

SUMMARY OF THE INVENTION

The test grading device of the present invention provides upon each comparison of the corresponding answer indication areas of the answer sheet and the answer key, a binary response indicating whether there is agreement or disagreement between the answers indicated in each corresponding pair of answer indication areas. The means for sensing the corresponding indication areas of the answer sheet and answer key provide binary signals to comparison means which provide in accordance with "exclusive-or" logic a binary signal indicative of either agreement or disagreement of the states of the binary signals received from the sensing means.

The test grading device of the present invention may be adapted for use with a disposable answer key or with a programmable answer key integral thereto. The present invention may be further adapted to provide a count of questions wherein there is an answer indication disagreement; to provide a count of all answer indication disagreements; to provide a printed score on the answer sheet in response to the provided count; and to mark the answer sheet in the area of each question response area wherein there is an answer indication disagreement and in each answer indication area wherein there is an answer indication disagreement.

The test grading device of the present invention provides for using the repetitious movement of the sensing means across the stack of stationary answer sheets to enable the actuation of the marking means; to move actuated marking means across the answer sheet; to actuate the printing of the score on the answer sheet; the removal of the top answer sheet following the printing of the score, the resetting of the counting means also following the printing of the score, and the resetting of the answer sheet removal means following the removal of the top answer sheet; and to reset the sensing means prior to scanning each question. In a preferred embodiment, the removal of *only* the top answer sheet is provided by so positioning the removal means in relation to the answer sheets that the gripping force exerted by the removal means on the top answer sheet is first increased until sufficient to separate the top answer sheet from means forcibly holding the answer sheets in a stationary stack and then relaxed so as not to disturb the remaining answer sheets in the stack. The movement of the sensing means also lowers the sensing means into engagement with the top answer sheet prior to scanning the first question and lifts the sensing means from the top answer sheet prior to the removal of the latter.

The test grading device of the present invention also provides means for delaying actuation of the scoring means for each question until after the answer indication areas for the question are completely scanned; means mounted on the answer sheet removal means for propping the removal means apart from the ungraded answer sheets during resetting of the removal means so as to disengage the removal means from the removed answer sheet and so as not to disturb the position of the ungraded answer sheets; and means for sensing the presence of answer sheets in the stationary area which sensing means acts to turn off the test grading device when all answer sheets have been removed therefrom.

The test grading device of the present invention further provides a sensing means containing an SCR reverse blocking triode thyristor which conducts sufficient current to the solenoids of the score counting and marking means to effect their actuation without the need for intermediate current amplification. The SCR is rendered conductive by a photocell sensing a darkened area.

BRIEF DESCRIPTION OF THE DRAWING

FIG. 1 is a perspective view of the test grading device of this invention;

FIG. 2 is a front view of the test grading device chassis shown in FIG. 1 with the front and top plates of the superstructure removed, and showing the answer key in position for scanning;

FIG. 6b is a perspective view of the cocking mechanism of FIG. 6a; the mechanism is shown in its forward or uncocked position following release;

FIG. 7 is a perspective view of the base plate of the cocking mechanism of FIGS. 6a and 6b;

FIG. 8 is a top view of one embodiment of the holder of the cocking mechanism of FIGS. 6a and 6b illustrating the positioning of a spring for increasing the force available for answer sheet removal upon the initial forward movement of the answer sheet removal means upon their release; this embodiment is alternative to that shown in FIGS. 2 and 4;

FIG. 9a is an isolated perspective view of the leg prop which is also shown as attached to a feed leg in FIGS. 6a and 6b;

FIG. 9b is a perspective view of the leg prop in contact with a feed leg;

FIG. 10 is a perspective view of a snap action switch and a pivot arm attached to the chassis of the test grading device which pivot arm by its operation contributes to the functions of: holding unscored answer sheets in place, lifting the feed legs and the answer sheet holding pin when loading ungraded answer sheets into the test grading device, and automatically turning off the test grading device following the grading and removal of all answer sheets;

FIG. 11a is a view of the counting wheel shown in FIGS. 2–4 taken from beneath the wheel and looking toward the wheel along an axis perpendicular to the plane of the wheel, and showing the wheel stepping and resetting means;

FIG. 11b is a side view of the counting wheel as shown in FIG. 11a and further shows the wheel stepping and resetting means;

FIG. 12 is an illustration of an answer sheet used in practicing the preferred embodiment of the test grading device as shown in FIG. 1;

FIG. 13 is an illustration of an answer key used in practicing the preferred embodiment of the test grading device as shown in FIG. 1;

FIG. 14a is a bottom view of a preferred embodiment of the answer sheet sensor module;

FIG. 14b is a front cross-sectional view of answer sheet sensor module of FIG. 14a taken along line B—B;

FIG. 14c is a top view of a marking pen actuation lever and of the positionable fulcrums which are also shown in FIG. 14b; there are separate levers for each corresponding pair of marking pens;

FIG. 14d is an end view showing the cooperation between a pen actuation lever and a positionable fulcrum which are also shown in FIGS. 14b and 14c taken along line D—D;

FIG. 15a is a bottom view of a preferred embodiment alternative to that shown in FIG. 14 of the answer sheet sensor module;

FIG. 15b is a perspective view of the top of answer sheet sensor module of FIG. 15a showing the marking pen and its related actuation apparatus;

FIG. 15c is a side view of the marking pen of FIGS. 15a and 15b shown in its operation positions;

FIG. 16 is a diagram in block form of the logic circuit defining the cooperation between the sensing means, comparison means and scoring means of the test grading device;

FIG. 17 is a diagram in block form showing an alternative embodiment of that portion of the logic circuit of FIG. 16 which provides the scoring response;

FIG. 18 is a schematic diagram of a preferred embodiment of the electric circuit of the test grading device and corresponds to the logic circuit of FIG. 16;

FIG. 19 is a schematic diagram of a preferred embodiment of the electric circuit of the test grading device and generally corresponds to the logic circuit of FIG. 16.

DESCRIPTION OF THE PREFERRED EMBODIMENT

Figure 3:
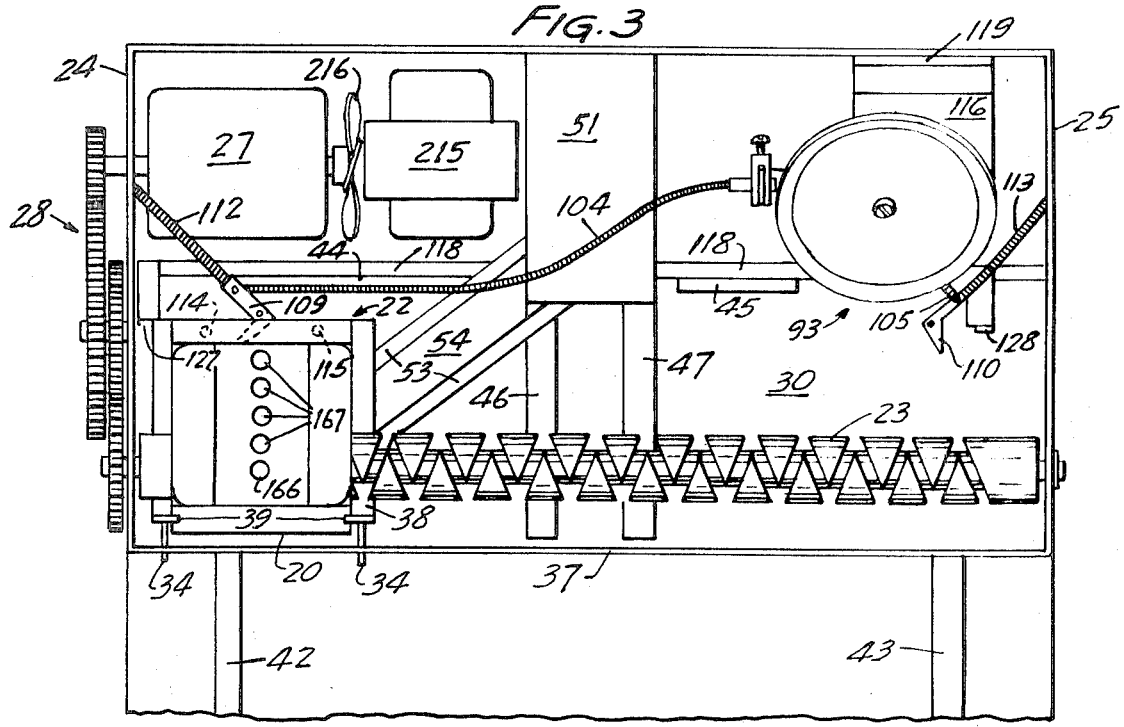
FIG. 3 is a top view of the superstructure of the test grading device shown in FIG. 1 with the top plate removed.
Figure 4:
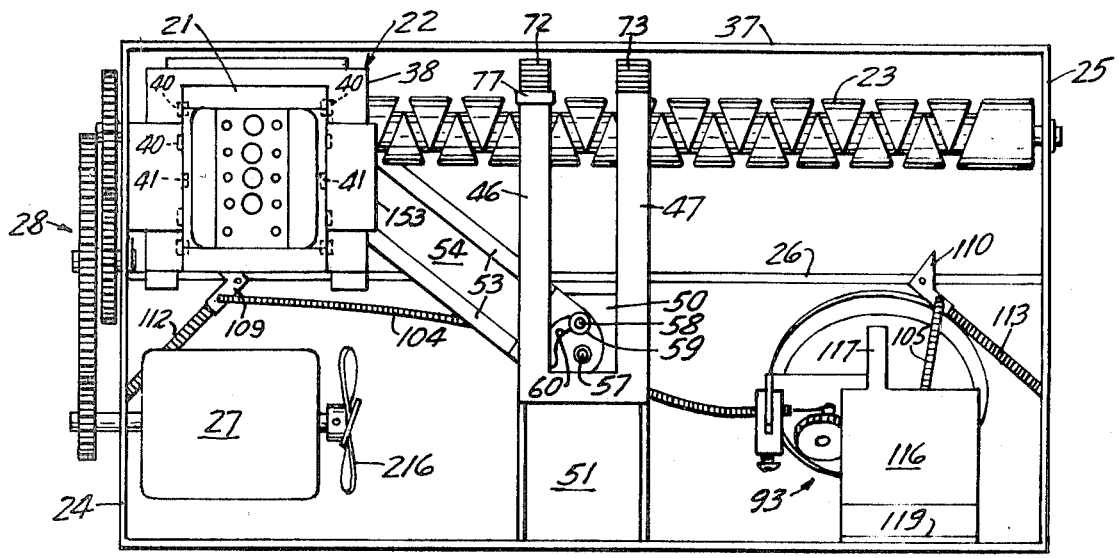
FIG. 4 is a bottom view of the superstructure of the test grading device shown in FIG. 1 with the base of the test grading device and the structure fastened thereto removed.

In its preferred embodiment, the test grading device of the present invention includes photocells which sense the answer indications from the answer sheet and the answer key by sensing the amount of light reflected from the answer indication areas of the answer sheet and the answer key. When practicing this embodiment, the teacher programs the answer key by darkening selected answer indication areas of the answer key and the student answers the questions by darkening selected answer indication areas of the answer sheet. The sensing means provide a binary signal in response to sensing darkened or undarkened answer indication areas, which response is dependent upon the intensity of the light reflected therefrom.

In other embodiments the test grading device of this invention may include combinations of sensing means which respond to other types of answer indications, such as the presence or absence of magnetic material, of electrically conductive material, of mechanical detents or of holes in the answer indication areas. Also in other embodiments, the sensing may be in response to the intensity of light transmitted through, rather than to, the intensity of light reflected from the answer indication areas.

Referring to FIGS. 1–5, the answer key sensor module 20 and the answer sheet sensor module 21 are supported by and contained in scanning sled 22. Scanning sled 22 is supported by lead screw 23 which is fitted through answer key sensor module 20. The portion of answer key sensor module 20 receiving lead screw 23 is so threaded that as lead screw 23 rotates, scanning sled 22 traverses back and forth between sides 24 and 25 of chassis 26. Lead screw 23 is rotated by motor 27 which communicates with the lead screw 23 through reduction gears 28.

Answer sheets 29 are so positioned in area 30 that the answer indication areas thereof can be scanned by answer sheet sensor module 21 during its course of travel.

The number of questions which may be graded in one column of an answer sheet is limited by the length of the answer sheet, the sensitivity of the sensing means and the response times of the sensing, comparing and scoring means.

Answer key 31 is so positioned in area 32 that its answer indication areas can be scanned by answer key sensor module 20. The scanning of the corresponding answer indication areas of answer sheets 29 by answer sheet sensor module 21, and of answer key 31 by answer key sensor module 20 need not be precisely simultaneous. It is only necessary that the scanning of both corresponding answer indication areas be completed before either sensor module 20 or 21 scans another indication area.

At both ends of its course of travel, scanning sled 22 is lifted in order to raise the answer sheet sensor module 21 from engagement with the answer sheets 29. The scanning sled 22 is lifted when either of pins 34 engages the respective lifting ramp 35 and moves into channel 36 in front plate 37.

Holding bracket 38 of scanning sled 22 is fitted to slide within slots 39, so that the scanning sled 22 can be lifted, inasmuch as the answer key sensor module 20 cannot be lifted in relation to lead screw 23.

Answer sheet sensor module 21 is held to scanning sled 22 by brackets 40 and mounts 41 and pivots on mounts 41 in such a manner that its face is flush with the top answer sheet of the stack 29, thereby maintaining a relatively uniform spacing between the sensing elements in the sensor module and the respective answer indication areas of the answer sheet.

Bars 42, 43, 44 and 45 are fastened to the chassis 26 so as to prevent lateral movement of the answer sheets 29 in three directions. The only lateral movement allowed is that which occurs when the scored answer sheets are removed from area 30 by feed legs 46 and 47.

Feed legs 46 and 47, which are the answer sheet removal means, are both cocked and released in response to the movement of the scanning sled 22. This response is controlled by cocking mechanism 49 illustrated in the cocked position in FIG. 6a and in the released position in FIG. 6b.

The feed legs 46 and 47 are pivotally connected to baseplate 50. Baseplate 50 slides within holder 51. Holder 51 is rigidly fastened to the chassis 26. The baseplate 50 is linked to the scanning sled 22 by telescoping linking arms 53 and 54.

Linking arm 54 is linked to the scanning sled 22 by a bolt 55 fastened to the underside of answer key sensor module 20 through aperture 56 in linking arm 54 so that linking arm 54 pivots about bolt 55. Linking arm 53 is linked to the baseplate 50 in two places. It is pivotally connected to peg 57 of the baseplate and it is also positioned so that peg 58 of the baseplate and ring 59 attached to peg 58 slide within slot 60 of linking arm 53 as linking arm 53 pivots about peg 57.

Although baseplate 50 is of solid construction, the portion containing peg 57 is connected to the remainder of baseplate 50 only through flexible hinge 62. Besides peg 57, the hinged portion 63 also contains an extended lip 64. This lip 64 is of such dimension that, when the cocking mechanism 49 is in its cocked position (FIG. 6a), this lip hooks over the edge of the holder 51 and retains the baseplate 50 in the cocked position as the scanning sled 22 continues to move past the cocking position and the linking arms 53 and 54 telescope apart from one another.

Figure 6A:
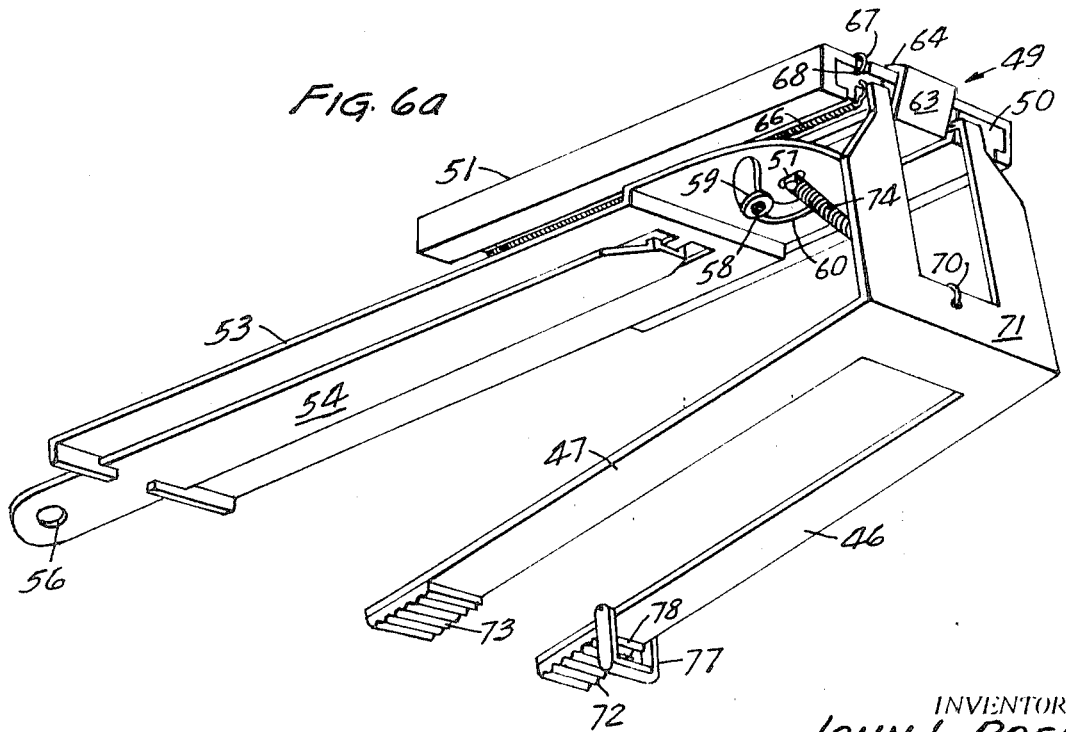
FIG. 6a is a perspective view of the mechanism for cocking the answer sheet removal means of the test grading device; the cocking mechanism is shown in its cocked position.

However, when the linking arms 53 and 54 are fully extended (FIG. 6b), the scanning sled 22, in continuing to move away from the cocking position, pulls on the lip 64 of baseplate 50 through the linking arms 53 and 54, peg 57 and hinged portion 63 and unhooks the lip 64 from the holder 51, thereby releasing baseplate 50 and allowing the feed legs 46 and 47 to move forward. The baseplate and feed legs are then propelled forward by the force of spring 66. Spring 66 is connected between the back of the baseplate 50 and the front of the holder 51 and is extended as the baseplate 50 is cocked. In one embodiment, in order to supplement the initial force supplied by spring 66, spring 67 is provided on the top side of the holder 51 as seen in FIGS. 6 and 8. This spring 67 has an extension 68 which is positioned through slot 69 to catch the back of the baseplate 50 as the baseplate 50 moves toward its cocked position (FIG. 6a). Thus, when the baseplate 50 is released, the spring 67 provides additional force for the distance equal to the length of the slot 69. The feed legs are positioned in relation to the baseplate by the aforementioned pivot connections and by compression spring 74 which is connected between peg 57 and fastener 70 at the waist 71 of the feed legs 46 and 47.

The feed legs 46 and 47 make contact with the answer sheets 29 through gripping pads 72 and 73, which rest lightly on the answer sheets and exert only a small bias force against the top answer sheet due to the holding action of spring 74 and gravity.

As the top answer sheet of the stack 29 is removed by feed legs 46 and 47, the remaining answer sheets in the stack 29 are held in place by pin 75 which protrudes through a number of the answer sheets. Feed legs 46 and 47 pivot from baseplate 50 about an axis above and rearward of the position where the gripping pads 72 and 73 grip the answer sheet stack 29. Therefore, when the feed legs 46 and 47 are moved forward, the gripping pads 72 and 73 exert an additional force against the top answer sheet which additional force is responsive to the forward movement of the feed legs 46 and 47 and which additional gripping force is exerted only until it increases sufficiently to overcome the force with which holding pin 75 holds the top answer sheet. When the force provided by pin 75 is overcome, the top answer sheet is pulled from pin 75 and the feed legs 46 and 47 pivot forward in response to the release of the top answer sheet. When feed legs 46 and 47 pivot forward, the gripping force of gripping pads 72 and 73 is relaxed and thereby not translated to any answer sheets beneath the top answer sheet. The bias gripping force is sufficient to remove the top answer sheet from the stack once the top answer sheet has been pulled from holding pin 75. The total force thus exerted by the feed legs 46 and 47 is sufficient to tear only the top answer sheet of the stack 29 from the pin 75 thereby leaving the remaining answer sheets of the stack 29 in position for scoring.

After the top answer sheet is removed and the feed legs reach their travel limit and decelerate, the feed legs 46 and 47 are lifted by their inertia from the stack of answer sheets, thereby allowing leg prop 77 to pivot into the position shown in FIG. 9b in which position the leg prop 77 holds the gripping pads above the answer sheets. Leg prop 77 is pivotally connected to feed leg 46 so that when the feed leg 46 is moving towards its cocked position, the plate 78 of leg prop 77 resets against gripping pad 72. Alternatively, leg props may be placed on both feed legs 46 and 47. When the feed legs 46 and 47 are almost in the cocked position (FIG. 6a), leg prop 77 falls off and behind the stack of answer sheets 29 so that gripping pads 72 and 73 contact the top answer sheet.

The leg prop 77 has a plate 78 only on the gripping pad side and is so constructed that when the feed legs 46 and 47 are released and move foreward (FIG. 6b), it (leg prop 77) pivots so as not to lift or hold the gripping pads 72 and 73 away from the answer sheets 29.

The paper holding pin 75 is mounted on pivot arm 79 shown in FIG. 10. Pivot arm 79 is raised by turning knob 80 in a counterclockwise direction thereby turning shaft 81 upon which is mounted an eccentric cam 82. Cam 82 rotates in curved groove 83 of pivot arm 79 to raise or lower the pivot arm 79. Pivot arm 79 is pivotally mounted to chassis 26 by shaft 84 which rotates within bar 44.

Holding pin 75 is positioned at the end of flexible spring arm 85. When answer sheets 29 are positioned in area 30 to be graded, flexible spring arm 85 is flexed so that a sufficient downward force is constantly applied to holding pin 75 to enable holding pin 75, as graded answer sheets are removed, to penetrate the answer sheets in the stack which were not initially penetrated because of their depth in the stack.

Extension 86 of pivot arm 79 is so positioned under feed leg 46 that it raises feed legs 46 and 47 from the answer sheets 29 when pivot arm 79 is raised. Extension 86 pushes against flexible spring arm 85 so that pin 75 is likewise removed from the answer sheets 29 when pivot arm 79 is raised.

Also connected to pivot arm 79 on flexible spring arm 85 is automatic shutoff switch 90. Switch arm 88 is pivotally mounted on the switch 90 to push in switch button 89 and thereby close the contacts of switch 90 when switch arm 88 rests on the answer sheets 29. Switch arm 88 maintains switch 90 in a closed position so long as it rests on the answer sheets above hole 91. However, if switch arm 88 drops into hole 91 in chassis 26, switch button 89 is released out thereby allowing the contacts of switch 90 to open which in turn turns off the test grading device. Thus, when there are no answer sheets in area 30, switch arm 88 drops into hole 91 and the test grading device is turned off. Switch arm 88 is lifted from the hole 91 when pivot arm 79 is raised so that answer sheets 29 may be positioned for scoring.

As the scanning sled 22 is traversing the answer sheets 29, a counting wheel 93 is being stepped in response to those disagreements between corresponding answer indication areas of the answer sheet 29 and the answer key 31 which are sensed by the answer key sensor module 20 and the answer sheet sensor module 21. The wheel 93 contains a series of stamp pads 94 containing a sequence of numbers. The stamp pads 94 are so positioned and the counting wheel 93 is so tilted that when the counting wheel contacts the answer sheet 29, only one of the numbered pads 94 is in position to contact the answer sheet 29. The pads 94 are made of "Porelon" brand porous plastic (manufactured by Johnson Wax Co. of Racine, Wisconsin) which pads are saturated with ink and which retain the ink for a very long time.

The wheel 93 is rotated in steps in direction 95 by the reciprocal movement of armature 97 in sawtooth rack 96. The armature reciprocates in response to each pulsed signal received by solenoid 98. Solenoid 98 is connected to a circuit 100 for comparing the corresponding answer indications sensed by sensor modules 20 and 21. The location of the comparison circuit 100 is discretionary, although locating it on sled 22 would be convenient in that flexible wires from the moving sensor modules 20 and 21 to a chassis mounted comparison circuit would not be necessary. Therefore, the comparison circuits are shown only schematically and are not otherwise illustrated in the figures showing the structure of the test trading device.

The counting wheel 93 may be so rotated from a given number indicative of the number of correct answers to deduct from this given number in response to pulses indicative of incorrect answers, in which case the counting wheel 93 will mark on the answer sheet 29 the number of correct answers, or the counting wheel 93 may be rotated to count from zero in response to the pulses indicative of incorrect answers, in which case the counting wheel 93 will mark the answer sheet 29 with the number of incorrect answers.

The counting wheel 93 is reset to its original position following the scoring of each answer sheet in response to movement of the scanning sled 22. The counting wheel resetting means include gear 99 which is rigidly mounted to the counting wheel axis and gear 101 which engages gear 99. Rigidly mounted 180° apart on gear 101 are lugs 102. Pivotally mounted to the axis of gear 101 are resetting arms 103 which are positioned to rotate independently of each other in an arc in which they push against lugs 102. Sheathed cables 104 and 105 are fastened to resetting arms 103. Referring to FIG. 11, it is seen that when either sheathed cable 104 or 105 is pulled, the resetting arm 103 to which the respective sheathed cable 104 or 105 is connected, is pulled and is thereby caused to pivot about the axis of gear 101. When a resetting arm 103 pivots against a lug 102, it pushes lug 102 and thereby causes gear 101 to rotate in direction 106 until the pivotal motion of resetting arm 103 is completed. Because of the positioning of the supports 108 through which the sheathed cable is passed the resetting arms 103 can be pulled only until they are in alignment with supports 108. Therefore, gear 101 can be rotated in direction 106 only to a limited position corresponding with the limit of rotation of resetting arms 103, thereby assuring that the counting wheel 93 is always returned to the same rotational position each time it is reset. The opposite ends of the sheathed cables 104 and 105 are fastened to levers 109 and 110 which are pivotally mounted on chassis 26 at opposite ends of the scanning sled's course of travel. The portion of chassis 26 to which levers 109 and 110 are mounted is shown only in FIG. 4. Levers 109 and 110 are held in a normally cocked position by springs 112 and 113 which are fastened to the sides 24 and 25 of chassis 26. Levers 109 and 110 are rotated to pull their respective sheathed cables 104 and 105 in response to movement of the scanning sled 22. Scanning sled 22 contains within answer key sensor module 20 shafts 114 and 115 which are so positioned that only one of them (shafts 114 and 115) passes past the lever 109 and 110 located at the end of the course of travel.

Figure 5:
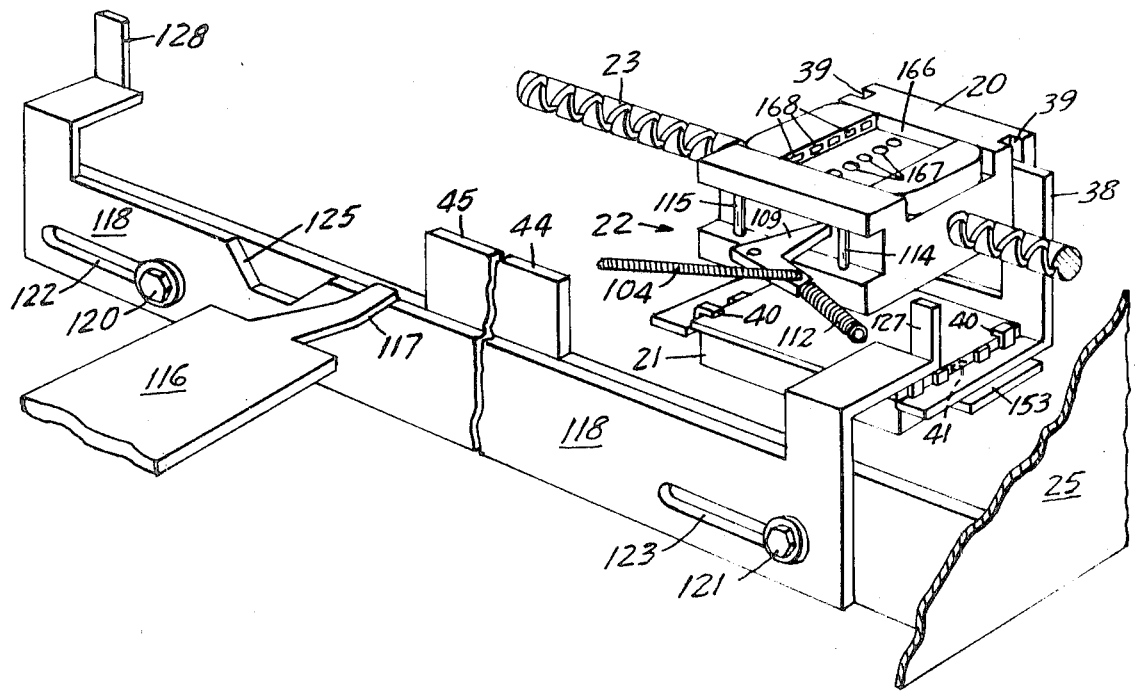
FIG. 5 is a perspective view of the scanning sled and of the mechanism which actuates the printing of the test score on the answer sheet; also shown is part of the mechanism which resets the counting means; these mechanisms are only partially observable in FIGS. 1–4.

Referring to FIG. 5, it is seen that as sled 22 moves past lever 109 toward chassis side 25, shaft 114 engages lever 109 causing lever 109 to rotate clockwise. This only flexes sheath cable 104 and has no effect on resetting arm 103. When the scanning sled 22 has reversed its direction and begins a new scan across the answer sheets 29, shaft 114 again engages lever 109. This time, lever 109 rotates counterclockwise and sheathed cable 104 is pulled thereby pulling resetting arm 103 to effect the resetting of the counting wheel 93 to its starting position.

The counting wheel 93 is brought into contact with the answer sheet 29 in response to movement of the scanning sled 22. The mechanism by which the counting wheel 93 is brought into contact with the answer sheet 29 is best shown in FIG. 5. The counting wheel (not shown in FIG. 5) is mounted on frame 116 and extends beyond frame 116 so that it is not prevented by frame 116 from contacting answer sheets positioned in area 30. Frame 116 is connected to chassis 26 by hinge 119. Extending from frame 116 is a cam follower 117 which rides on slideable cam 118. Slideable cam 118 is fastened to slide within chassis 26 by lugs 120 and 121 which pass through slots 122 and 123 in slideable cam 118. Slideable cam 118 contains a groove 125 into which groove cam follower 117 drops when the slideable cam 118 slides by. When cam follower 117 drops into groove 125, the counting wheel 93 drops into contact with the answer sheet 29. As the slideable cam 118 continues its movement, cam follow 117 climbs out of groove 125 and the counting wheel 93 is lifted off the answer sheet.

Slideable cam 118 contains extended arms 127 and 128 at its ends, which arms 127 and 128 are positioned to be pushed by scanning sled 22 as scanning sled 22 completes its course of travel in a given direction. Thus, at the end of the scanning of each answer sheet 29, the scanning sled 22 pushes slideable cam 118 thereby causing cam follower 117 to pass through groove 125 so as to temporarily drop the numbered pad 94 of counting wheel 93 into contact with answer sheet 29. The placement of the cam follower 117 and slideable cam 118 are such that the counting wheel 93 is lifted from the answer sheet 29 by lifting ramps 35 before the scanning sled 22 moves so far as to cause the feed legs 46 and 47 to be released from their cocked position.

FIG. 12 illustrates the type of answer sheet 29 used with this test grading device. The student indicates his answers by darkening selected answer indication areas 130. A pencil or like means may be used to so darken the indication areas. The answer sheets are usually paper. The question numbers, letters and brackets which are printed on the prepared answer sheets are either printed through a screen so as to be composed of spaced dots so that they will not be sensed as a darkened area; or they are printed in a color (e.g., red) and a correspondingly colored filter is placed over the photocells so that the printed numbers, letters, and brackets will not affect the quantity of reflected light.

FIG. 13 illustrates the answer key 31 used with this test grading device. The teacher programs the correct answers by darkening selected answer indication areas 132, which correspond in position and size with the answer indication areas 130 of answer sheet 29. The column of dark marks 133 are strobe marks which will be discussed later herein.

Slots 135 are placed in answer key 31 to correspond with pegs 136 on chassis 26 so that answer key 31 can be positioned on chassis 26; be restrained from lateral movement in relation thereby; and always be accurately aligned in relation to the travel path of answer key sensor module 20.

The answer key has a backing of light reflective opaque rigid material. The face of the answer key containing the strobe marks and the question numbers, letters and brackets is overlaid with a thin transparent material upon which the teacher may place indicia in the appropriate answer indication areas and from which these indicia may be wiped away. Alternatively, the answer key is a disposable paper sheet which is held in position by an opaque rigid backing.

The answer key as illustrated is laid face down in area 32 in order to face answer key sensor module 20.

If the answers on the answer sheet and answer key are indicated by inserting magnetic material or electrically conductive material in the answer indication areas, the sensing means are adapted to respectively sense magnetic material or electrically conductive material in the answer indication areas. Answers could also be indicated by placing holes in the answer indication areas of the answer key, in which case the answer key sensing means would be adapted to sense holes. Answers can also be indicated by selective positioning of mechanical detents which when scanned actuate mechanical to electrical transducers.

The sensor modules in the preferred embodiment respond to reflected light and produce a binary signal indicating whether or not an answer indication area has been darkened. Different embodiments of the answer sheet sensor module are illustrated. The answer sheet sensor module 21 is used when it is desired to mark the answer sheet in each answer indication area in which the sensed student indication disagrees with the corresponding answer key indication. The answer sheet sensor module 137 is used when it is desired to mark the answer sheet only in the area of each question in which the sensed student indication disagrees with the corresponding answer key indication. The answer key sensor module 20 is used with either type of answer sheet sensor module, 21 or 137.

The answer sheet sensor module 21 is described with reference to the views of FIG. 14. Photocells 139 are positioned to receive light reflected by the answer sheet 29 from light bulbs 140 through windows 141 in surface 142. Marking pens 144 and 145 are positioned to mark the answer indication areas of answer sheet 20 in response to movement of the armature 146 of solenoid 147. The motion of armature 146 is translated to pens 144 and 145 through pen actuation lever 149 which is fixed in a stationary position at one end thereof by one of positionable fulcrums 151 or 152 which are extended from slideable plate 153 and which pass through slots 154 and 155 in lever 149 to hook under the underside of lever 149. In the position shown in FIG. 14b, the left end of lever 149 is held in a fixed position and the right end is allowed to move freely. Thus, when the armature 146 moves, pen 145 is moved downward a greater distance than pen 144 and marks the answer sheet whereas pen 144 does not. Pens 144 and 145 are normally restrained from the answer sheet by springs 157. Springs 158 hold lever 149 in its normal position. When the scanning sled 22 completes its course of travel in one direction, plate 153 presses against the edge of the chassis 26 and slides so as to move the extended fulcrums 151 and 152 within slots 154 and 155 and as a result, change the end of plate 149 which is held in a fixed position. As a result, the pen 144 or 145 which trails the photocell 139 in the direction of travel will always be the one which is enabled to mark the answer indication area of the answer sheet.

When it is desired to mark the answer sheet only in the area of the question 160 rather than in each answer indication area 130 of the answer sheet, answer sheet sensor module 137 shown in FIG. 15 is used. In this embodiment, only one marking pen 162 is used, which pen 162 is moved downward to contact the answer sheet 29 in response to the movement of the armature 164 of the solenoid 165.

Pen 162 is pivotally fastened at one end to armature 164 and at the other end it is fitted through a slot in pen shuttle 161. Pen shuttle 161 contacts the answer sheet and will drag within the limits of slot 163 in answer sheet sensor module 137. Thus, pen 162 will always trail photocells 139 in the direction of travel. In FIG. 15c the pen 162 and pen shuttle 161 are shown in heavy lines to correspond to movement of the scanning sled 22 from left to right and in dashed lines to correspond to scanning sled 22 movement of right to left.

The answer key sensor module 20 is constructed in the same manner as the answer sheet sensor modules 21 and 137 except, of course, the marking pens 162 or 144 and 145 and the apparatus incident thereto are eliminated. Photocells 166 and 167, windows 168 and the light bulb (not shown) in answer key sensor module 20 (FIG. 5) are placed in the same configuration as that shown for photocell 139, light bulb 140 and windows 141 in answer sheet sensor module 21 or 137. One lamp may be used rather than two in all sensor modules.

So that the answer key 31 need not be mirrored from the design shown in FIG. 13, connections from the photocells 139 of the answer sheet sensor module 21 or 137 to the comparison circuit 100 are the reverse of the connections from photocells 167 of the answer key sensor module 20 to the comparison circuit 100. That is to say: the inside photocell 139 of answer sheet sensor module 21 or 137 corresponds to the outside photocell 167 of answer key sensor module 20, and so forth.

The cooperation between the sensing means 170 and 171, the comparison means 100 and the scoring means 173 and 174 will be described with reference to FIGS. 16, 17, 18 and 19. Referring first to FIG. 16, corresponding answer key sensing means 170 and answer sheet sensing means 171 sense the answer indication areas of the answer key and answer sheet at approximately the same time and provided binary signals on lines 178 and 179 respectively indicating to comparison means 100 whether each sensed answer indication area was darkened.

The comparison means 100 operate in accordance with "exclusive-or" logic and provide a binary signal on lines 181 indicating whether the signals received on lines 178 and 179 are in agreement or disagreement. In one preferred embodiment, a "0" pulse on line 181 indicates agreement in the signals on lines 178 and 179, and a "1" pulse indicates a disagreement of the signals on lines 178 and 179. This "1" pulse is held only so long as a disagreement is indicated between lines 178 and 179.

In this embodiment, a "1" pulse on lines 178 and 179 indicates a darkened area has been sensed. A "1" pulse, once impressed on lines 178 or 179, is held until the sensing means 170 and 171 receive a reset pulse on line 180. The reset pulse could be of zero voltage or of some finite voltage depending upon the particular circuit configuration of the sensing means 170 and 171.

The output line 181 of each comparison means 100 is separately connected to one of the inputs of one of the AND gates 183 and is jointly connected with all other output lines 181 of the other comparison means 100 to one of the inputs of an AND gate 184. The other input to each AND gate 183 and 184 is received on line 186 from strobe means 188. Strobe means 188 delivers and holds a "1" pulse to AND gates 183 and 184 on line 186 and to resetting means 190 on line 191 whenever photocell 166 in answer key sensing module 20 senses a strobe mark 133 on answer key 31. At the conclusion of the "1" pulse, the resetting means delivers a reset pulse on line 180.

Thus, if a disagreement is sensed by the sensing means 170 and 171 between corresponding answer indications of the answer sheet and answer key, a "1" pulse is received on one of lines 178 or 179 and a "0" pulse received on the other, thereby producing a "1" pulse on line 181 from the comparison means to the AND gates 183 and 184. This "1" pulse on line 181 is held until after the strobe means have provided a "1" pulse on line 186. Simultaneous "1" pulses on lines 181 and 186 to both inputs of the AND gates 183 and 184 deliver an enabling pulse to the respective scoring means 173 and 174. Amplifiers 192–196 are placed between the AND gates 183 and 184 and the respective scoring means 173 and 174 when the current of the AND gate output signal is of such magnitude that it must be amplified to enable the scoring means 173 and 174. When photocell 166 passes beyond each strobe mark 133, the reset pulse is delivered on line 180 to reset the sensing means 170 and 171 so as to again provide a "0" pulse on both lines 178 and 179.

The strobe marks 133 are placed on answer key 31 so that they are sensed by photocell 166 only during such times as the answer indication areas 132 are not being sensed by photocells 167. In this manner, it is assured that the scoring means are delayed in operation until such time as the answer indication areas 130 and 132 of the answer sheet 29 and answer key 31 are completely scanned, thus making less critical the size, the intensity and the precise location of the darkened indications placed by the student or the teacher within the respective answer indication areas 130 and 132. Likewise, there is a greater tolerance allowed in placement of the answer sheets 29 with respect to the path of travel of the scanning sled 22. The strobe pulse is terminated before the beginning of the answer indication areas for each succeeding question so that the sensing means may be reset before sensing the answer indication areas of each succeeding question.

Each scoring means 173 is enabled only if the sensing means 170 and 171 to which it is connected through comparison means 100 and AND gate 183 indicate a disagreement between corresponding answer indication areas. Scoring means 173 are, in one preferred embodiment, marking pens 144 and 145 which are positioned to mark in the answer indication areas of the answer sheet. The distance between the marking pen 144 or 145 and the photocell 139 corresponds to the distance between the alignment of the answer indication areas and the strobe mark so that the delayed actuation of the enabled marking pen 144 or 145 occurs while the enabled marking pen 144 or 145 is over the answer indication area just sensed by photocell 139.

Scoring means 174 is enabled when any or all corresponding pairs of sensing means 170 and 171 indicate through their comparison means 100 to AND gate 184 a disagreement between corresponding answer indication areas. Scoring means are, in alternative preferred embodiments, a marking pen, counting means, or a combination thereof. The scoring means 174 is, in one embodiment, marking pen 162. In this embodiment, the sizes of pen shuttle 161 and slot 163 are such that pen 162 trails the alignment of photocells 139 by a distance corresponding to the distance between the alignment of the answer indication areas and the strobe mark, so that the delayed actuation of the marking pen 162 occurs while the marking pen 162 is in line with the question just sensed by the photocells 139. In another embodiment, the scoring means 174 is the combined marking pens 144 and 145 which operate as described hereinabove in relation to scoring means 173.

The scoring means 174 are also alternatively counting means. In one preferred embodiment, the scoring means include counting wheel 93 which is rotated one number location in response to each pulse delivered by AND gate 184. In the embodiment shown in FIG. 16, only one pulse is delivered from AND gate 184 for each question if there is one or more sensed disagreements between corresponding answer indication areas. Thus, as scoring means 174, the counting wheel 93 counts only the number of questions in which at least one disagreement between corresponding answer indication areas is sensed.

In an alternative preferred embodiment partially shown in FIG. 17, the scoring means 198 responds discretely to each sensed disagreement between corresponding answer indication areas. The amplifier circuits 192–195 contain lead or lag networks which are designed to so stagger the arrival of the signals from the separate AND gates 183 that the scoring means 198 responds discretely to the pulses delivered from each AND gate 183. Thus, in this embodiment, as scoring means 198, the counting wheel 93 counts each disagreement sensed on the answer sheet between corresponding pairs of answer indication areas.

While only four parallel pairs of sensing means have been shown in FIG. 16, it is to be understood that any number of sensing means pairs could be used depending on the number of columns of possible choices on the answer sheet. Only two would be used if it were desired to build a machine which graded only true/false questions, and by the same token, means for sensing five columns would be provided if it were desired to build a test grading device which graded multiple choice questions having five possible answer areas. An advantage of a test grading device having five pairs of sensing means would be that such a test grading device could simultaneously grade parallel sets of true and false questions with one set of true/false questions being placed in columns $a$ and $b$, and the other set of true/false questions being placed in columns $d$ and $e$.

For the embodiment of the test grading device which is capable of also grading true/false questions, an additional strobe means is provided in order to stagger the scoring responses so that separate scoring responses are provided to the counting means for each two true/false questions being simultaneously scanned. The area which corresponds to column "$c$" of the answer sheet can be used to indicate the numbers of the true/false questions the answers to which are indicated in columns "$d$" and "$e$."

FIG. 18a (the disclosure of which is also the subject of a pending U.S. Pat. application by Albright, Ser. No. 829,357, filed June 2, 1969) illustrates one preferred embodiment of the electrical circuit of this invention, in which schematic circuit diagrams are shown for the answer key sensing means 170, the answer sheet sensing means 171, the comparison means 100, AND gate 184, current amplifying means 196, scoring means 174, strobe means 188, resetting means 190 and means 200 for providing sources of DC bias voltage from an AC voltage source 214.

In the sensing means 170 and 171, photocells 167 or 139 respectively become relatively nonconductive upon sensing a darkened area. Therefore, upon photocell 167 or 139 sensing a darkened area, the voltage level at the gate of PUT (programmable unijunction transistor) 202 or 203 respectively decreases to a level sufficiently less than the respective PUT anode potential to turn on the respective PUT 202 or 203 and produce a "1" pulse at the cathode of PUT 202 or 203 respectively. Thus, the presence of an indicia in an answer indication area 132 or 130 causes sensor means 170 or 171 to respectively deliver to comparison means 100 a "1" and the absence of an indicia results in the delivery of a "0" pulse.

The comparison means 100, which in this embodiment is an "exclusive-or" gate, receives signals from sensing means 170 and 171 on lines 178 and 179 respectively. If both signals received on lines 178 and 179 from sensing means 170 and 171 respectively are the same, whether both "1" or both "0," a "0" pulse is delivered on "exclusive-or" gate output line 181. If, however, the signals received on lines 178 and 179 are unlike, a "1" pulse is delivered on "exclusive-or" gate output line 181.

Strobe means 188 delivers a "1" pulse on output line 191 to resetting means 190 and on output line 186 to AND gate 184 whenever photocell 166 senses a darkened area. This "1" pulse lasts only so long as a darkened area is being sensed by photocell 166. Thus, a "1" pulse is delivered by strobe means 188 while photocell 166 senses a strobe mark 133 on answer key 31.

Resetting means 190 delivers a reset pulse on line 180 to sensing means 170 and 171 upon the removal of the "1" strobe pulse from line 191. The "1" strobe pulse places the same voltage bias on both the gate and anode of PUT 205 of resetting means 190. Upon receipt of a "0" pulse from the strobe means 188, the voltage at the gate of PUT 205 returns immediately to zero, but the voltage at the anode is maintained until discharged through capacitor 206, thereby causing PUT 205 to deliver a short reset pulse on line 180 to the anodes of PUTs 202 and 203 of sensing means 170 and 171. This reset pulse on line 180 reduces the voltage at the anodes of PUTs 202 and 203 to ground potential and terminates their conduction, if any, which conduction, if any, had been maintained since the origin of such conduction in response to the sensing of a darkened area by photocell 167 or 139 respectively.

Thus, a "1" pulse, if any, is maintained on input line 181 to AND gate 184 from its inception during the scanning of the answer indication areas 132 and 130 until the strobe mark 133 is completely scanned and a "1" pulse is maintained on input line 186 to AND gate 184 during the scanning of the strobe mark 133. Therefore, AND gate 184 delivers a scoring pulse during the duration of the strobe pulse scan whenever a corresponding pair of sensing means 170 and 171 sense a disagreement for corresponding answer indication areas 130 and 132.

Scoring means 174 contains solenoid coil 98 which upon being energized steps counter 93 and solenoid coil 165 which upon being energized actuates a marking pen 162 into contact with the answer sheet 29. The scoring means 174 are actuated in response to a signal on output line 197 from current amplifier circuit 196 which amplifier is actuated in response to a scoring pulse from AND gate 184 on line 185.

The DC voltage levels necessary for operation of these circuits of FIG. 18 are supplied by circuit 200 which is shown connected to a source of AC voltage 214.

The identification or value of the circuit elements for one embodiment of the circuits shown in FIG. 18 are:

Photocells:
    139—CL905HL
    166—CL905HL
    167—CL905HL
PUTs:
    202—D13T1
    203—D13T1
    205—D13T1
NPN transistors:
    240—2N4921
    241—2N5172
    242—2N5172
    243—2N4400
    244—2N5172
    245—2N5172
    246—2N5172
    247—2N5172
    248—2N4921
PNP transistors:
    250—2N4125
    251—2N4125
    252—2N4125
Zener diodes:
    254—1N4740
    255—1N4732A
Rectifiers:
    257—1N4003
    258—1N4003
    259—DHD806
    260—DHD806
    261—DHD806
    262—DHD806
    263—DHD806
    264—1N4003
Capacitors:
    206—0.1 µf.
    266—1000 µf.
    267—0.1 µf.
    268—0.022 µf.
Variable resistors:
    299—50K Ω
    300—200K Ω
Potentiometers:
    302—1K Ω
Resistors:
    271—390 Ω
    272—390 Ω
    273—2.7K Ω
    274—470 Ω
    275—2.2K Ω
    276—680 Ω
    277—4.7K Ω
    278—2.2K Ω
    279—2.7K Ω
    280—2.2K Ω
    281—1K Ω
    282—100K Ω
    283—220 Ω
    284—1.5K Ω
    285—1K Ω
    286—2.2K Ω
    287—33K Ω
    288—15K Ω
    289—5.6K Ω
    290—15K Ω
    291—5.6K Ω
    292—5.6K Ω
    293—47K Ω
    294—47K Ω
    295—1.5K Ω
    296—560 Ω
    297—10K Ω.

The bias voltage values shown in FIG. 18 are appropriate for the embodiment in which the foregoing circuit elements are used. The counting wheel solenoid 98 is rated at 5 watts and the marking pen solenoid 165 is rated at 1 watt.

The position in chassis 26 of transformer 215 is shown in FIG. 3. Transformer 215 is cooled by fan 216 mounted on the shaft of motor 27.

Another preferred embodiment of that portion of the electrical circuit containing the sensing means, comparison means, and scoring means is shown in FIG. 19. The answer key and answer sheet sensing means 170 and 171 each contain an SCR (silicon controlled rectifier) reverse blocking triode thyristor 222 and a photocell 139 and 167 respectively. When the photocell 139 or 167 senses a darkened area, the respective SCR 222 is triggered into a conduction state. The comparison means 100 is a reed switch coil 227 and contacts 228. The coil 227 is connected between the anodes of the SCRs of the answer sheet sensing means 171 and the answer key sensing means 170. Reed switch coil 227 is energized only when one SCR 222 is conducting and the other SCR 222 is not. When the reed switch coil 227 is energized, reed switch contacts 228 close thereby grounding line 230 and thus completing a conduction path to ground from line 235 through coils 98, 147 and 148. Coil 148 actuates marking pens 217 or 218 (FIG. 14a) which mark in the question area 160 of answer sheet 29. When no disagreement is sensed, that is, when either both SCRs 222 are conducting or when neither SCR 222 is conducting, switch contacts 228 remain open and an open circuit condition is maintained in the conduction path between coil 147 and ground, at contact 231. The SCRs 222, once turned on, continue to conduct until such time as a zero voltage reset pulse is received on line 233 to turn off the SCRs 222. A finite voltage is maintained on line 233 except during the interval of the reset pulse. The signal on line 233 is provided in the same manner as the signal is provided on line 180 in the circuit of FIG. 18. A constant DC voltage supply is maintained on line 234. A finite DC voltage strobe pulse is produced on line 235 in response to the sensing of the strobe mark on the answer key 31 in the same manner as a finite voltage strobe pulse is provided on line 186 in the circuit of FIG. 18. If a disagreement has been sensed in one of the corresponding pairs of answer indication areas resulting in the closing of switch contacts 228, the strobe pulse on line 235 energizes coils 198, 147 and 148 and actuates the counting wheel 93, and the marking pens 144 or 145, and the marking pens 217 and 218 respectively. The reset pulse on line 233 is not received until the conclusion of the voltage pulse on line 235. Solenoid coupled 148 is coupled to the marking pen 217 or 218 which marks in the question area 160 of the answer sheet 29 whereas solenoid coils 147 are coupled to the marking pens 144 or 145 which mark in the answer indication areas 130 of the answer sheet 29.

In the circuit of FIG. 19, the current amplifiers have been eliminated as unnecessary and the AND gates and scoring means have been combined, thereby eliminating a considerable number of circuit elements.

The identification and values of the circuit elements shown in FIG. 19 are:

Photocells

| | | |
|---|---|---|
| 139 | CL905HLL | Manufactured by Clairex Company of New York, N.Y. |
| 167 | CL905HLL | Manufactured by Clairex Company of New York, N.Y. |

SCRs

| | | |
|---|---|---|
| 222 | 2N4096 | Manufactured by Fairchild Semiconductor Company of Mountainview, Calif. |

Variable Resistors

| | |
|---|---|
| 224 | 15 KΩ |

Resistors

| | |
|---|---|
| 225 | 2 KΩ |

Reed Switch

| | | |
|---|---|---|
| 100 (227,228) | Model No. | 410/A manufactured by Price Electric Company of Fredricksville, Md. |

Rectifiers

| | |
|---|---|
| 264 | 1N4003 |

SUMMARY OF OPERATION

The various components of the test grading device have been described. These components are combined and provide consistent reliable test grading by synchronizing the operation of these components to the movement of the scanning sled 22.

First the answer key 31 is programmed and placed in position 32. And the scanning sled 22 is positioned at one end of its path of travel with pin 34 in channel 36. The pivot arm 79 is raised and a stack of ungraded answer sheets 29 are positioned in area 30. As the pivot arm 79 is lowered the gripping pads 72 and 73 contact the top answer sheet; the holding pin 75 penetrates the answer sheets; and switch arm 88 is rotated by the answer sheet stack to push in switch button 89 to close the contacts of automatic shutoff switch 90 in order to enable the operation of the test grading device. Scanning sled 22 then commences to traverse back and forth across the answer sheets 29 and does so continuously until such time as there are no longer any answer sheets 29 in area 30 and switch arm 88 drops into hole 91 thereby releasing switch button 89 to come out and thus open the contacts of automatic shutoff switch 90 in order to turn off the test grading device.

As scanning sled 22 moves away from the side 24 or 25 of the chassis 26, pin 34 rides down lifting ramp 35 thereby allowing answer sheet sensor module 21 to engage and ride over the answer sheet stack 29. Before the answer indication areas 130 and 132 for any question are scanned, however, pin 115 or 116 on the answer key sensor module 20 rotates lever 109 or 110 to reset the counting wheel 93 to its starting position. A strobe mark 133 is sensed before any answer indication areas 130 or 132 are sensed to assure that the sensing means 170 and 171 have been reset.

The answer indication areas 130 and 132 of the answer sheet 29 and answer key 31 are then scanned and the indications placed by the student and teacher are sensed and compared. Any signals indicating a darkened answer indication area are maintained. After all answer indication areas for a given question are completely scanned, the photocell 166 in the continuously moving answer key sensor module 20 senses the next strobe mark 133. Any signal indicating a disagreement in answer indications sensed for corresponding pairs of answer indication areas 130 and 132 is maintained and then combined with a signal produced during the sensing of the next strobe mark 133 to actuate the scoring means. The scoring means, upon being actuated, place a mark in the answer indication areas 130 of the answer sheet 29 wherein the student's answer indication (either a darkened indicia or the absence of a darkened indicia) disagree with the teacher's answer indication in the corresponding answer indication areas 132 of the answer key 31; place a mark in the question area 160 of the answer sheet 29 for that question; and/or step the rotation of counting wheel 93. Following the sensing of the strobe mark 133 but before scanning the answer indication areas 130 and 132 for the next question, the sensing means 170 and 171 are reset.

As the scanning sled 22 moves toward the midpoint of its course of travel, linking arms 53 and 54 are being moved by the scanning sled 22 to cock the feed legs 46 and 47. As the feed legs are being cocked, the gripping pads 72 and 73 are held apart from the answer sheets 29 by leg prop 77. When the feed legs 46 and 47 are cocked, the leg prop 77 drops off of and behind the answer sheet stack 29, thereby allowing the gripping pads 72 and 73 to contact the top answer sheet. As the scanning sled 22 moves away from the midpoint of its course of travel, linking arms 53 and 54 telescope apart and do not act upon the cocking mechanism 49 to release it until they (linking arms 53 and 54) are fully extended.

Before the linking arms 53 and 54 are fully extended however, all questions are scanned; the counting wheel 93 rotation, if any, is completed; and the answer key sensor module by pushing against extended arms 127 or 128 of slideable cam 118 pushes the groove 125 of slidable cam 118 past cam follower 117 so that counting wheel frame 116 is lowered and raised to permit counting wheel 93 to print the numerical score for the graded test on the answer sheet in area 265.

After the scanning sled 22 has moved far enough to effect the printing of the score on the answer sheet and the pin 34 climbs ramp 35 in order to lift answer sheet sensor module 21 from the answer sheets 29, the linking arms 53 and 54 are pulled fully apart. The movement of the scanning sled 22 then produces a pulling motion against lip 64 of cocking mechanism 49 which results in lip 64 becoming unhooked from holder 51 thereby releasing the cocking mechanism 49 and allowing the feed legs 46 and 47 to move forward. As feed legs 46 and 47 move forward, gripping pads 72 and 73 are forced into tighter contact with the top answer sheet and cause the top answer sheet to tear away from holding pin 75 and feed away from area 30. Following the release of the top answer sheet from holding pin 75, the grip of the gripping pads 72 and 73 on the top answer sheet is relaxed and the top answer sheet is fed away without disturbing the ungraded answer sheets.

When the feed legs 46 and 47 reach their limit of forward travel, their inertia causes them to pivot about baseplate 50 up and away from the answer sheet stack 29. When the feed legs 46 and 47 swing up and away from the answer sheet stack, leg prop 77 pivots into position to hold the gripping pads 72 and 73 away from the stack of answer sheets 29 until the feed legs 46 and 47 are again cocked. During forward or feeding motion of the feed legs 46 and 47, the leg prop 77 pivots into position between the feed legs 46 and 47 and the answer sheets 29, and the leg prop exercises no propping effect.

Before the scanning sled completes its travel in one direction, shaft 115 or 116 passes lever 109 or 110 and attains position to rotate the lever in a direction to effect resetting of the counting wheel 93 after the sled's direction of travel is reversed.

When the scanning sled reaches the end of its travel, plate 153 in answer sheet sensor module 21 pushes against the side 24 or 25 of the chassis 26 and is repositioned so that the marking pen 144 or 145, which trails the photocell 139 in the direction of travel, is enabled to contact the answer sheet during the next scan.

The scoring response capability of this test grading device is described with reference to FIGS. 12 and 13. The teacher has programmed answer key 31 to indicate that for each question 1 through 5, only one answer indication area should be darkened by the student, to wit: "a," and that for each of questions 6 through 9, two answer indication areas should be darkened by the student, to wit: "a" and "b."

The student answered question 1 correctly so the marking pens placed no marks on the answer sheet in the line of question 1.

The student answered "b" for question 2. As a result, the marking pens marked areas "a" and "b" in which a disagreement was sensed in comparing corresponding areas of the answer key answer sheet and in the question area 160 since a disagreement between corresponding areas was sensed for the question.

In question 3, the student darkened areas "b" and "c." Both were wrong, so the marking pens marked areas "a," "b" and "c,"as well as in question area 160.

In question 4, the student darkened areas 'a" and "b." Since only his answer of "b" was wrong, only area "b" and question area 160 were marked by the marking pens.

In question 5, the student darkened no area. Therefore, only area "a" and question area 160 were marked by the marking pens.

In question 6, the student darkened "a" correctly but missed "b." Therefore, scoring marks were placed on the answer sheet in the area "b" and question area 160.

In question 7, wherein the student correctly darkened "a" but incorrectly darkened "c" and not "b," areas "b," "c" and the answer area 160 were marked by the marking pens.

In question 8, the student marked "c" and "d" and the marking pens responded by marking each answer indication area "a," "b," "c" and "d" and question area 160.

In question 9, the student correctly answered both "a" and "b" but also darkened "c." Marking pens marked area "c" and the question area 160.

The counting wheel, having been stepped from zero in response to the number of questions in which a disagreement was sensed, scored the test by printing the number "8" in area 265 of the answer sheet. Had the counting wheel been stepped from zero in response to each sensed disagreement, the number "15" would have been printed in area 265 of the answer sheet.

From the foregoing, it is seen that this test grading device is cheatproof. The student could not fool it by darkening more or fewer answer indication areas than should have been darkened to indicate the correct answers. A scoring response was provided for each erroneous answer indication by the student. Marks were placed in the answer indication areas so as to inform the student exactly what the correct answers should have been. Marks were placed in the question area 160 to indicate which questions were incorrectly answered so that a person examining the answer sheet can more readily ascertain such information. Finally a score reflecting the student's achievement on the test is printed on the answer sheet.

What is claimed is:

1. A test grading device for automatically scoring a plurality of answer sheets, each answer sheet containing a plurality of answer indication areas for each question, comprising
    holding means for forcibly holding a plurality of said answer sheets in a stationary stacked position;
    movable scanning means for movably scanning the answer indication areas of a said held answer sheet and the answer indication areas of an answer key, which answer key has answer indication areas corresponding to the answer indication areas of each said answer sheet;
    answer sheet sensing means operatively coupled to the movable scanning means for sensing answer indications in said scanned answer indication areas of each said answer sheet;
    answer key sensing means operatively coupled to the movable scanning means for sensing answer indications in said scanned answer indication areas of said answer key;
    comparing means operatively coupled to the answer sheet sensing means and to the answer key sensing means for comparing answer indications sensed by the answer sheet sensing means with answer indications sensed by the answer key sensing means, which comparing means provide signals indicating agreement or disagreement between said indications sensed from the answer sheet and the answer key;
    scoring means operatively coupled to the comparing means for scoring each said held answer sheet in response to said signals provided by the comparing means; and
    removing means operatively coupled to the scanning means for removing seriatim from the holding device each said held answer sheet in response to said movement of the scanning means in completing said scanning of the answer indication areas of each said held answer sheet.

2. A test grading device according to claim 1, wherein the removing means remove from the test grading device each answer sheet, the scoring of which has been completed.

3. A test grading device according to claim 1, wherein the removing means are physically coupled to the scanning means for physically actuating the removing means in response to said movement of the scanning means.

4. A test grading device according to claim 3, wherein the removing means, when removing a said answer sheet, moves from a cocked position to a forward position, which test grading device further comprises
    resetting means physically coupled to the scanning means and responsive to the movement of the scanning means during at least a portion of said scanning of the answer indication areas of said answer sheet for physically resetting the removing means into said cocked position.

5. A test grading device according to claim 4, further comprising
    pin means for forcibly holding a stack of said answer sheets in a stationary position; and
    wherein the removing means and the resetting means comprise
    a stationary holder;
    a baseplate slideably mounted within the stationary holder to move between the cocked and the forward positions, which baseplate contains a lip for retentively hooking onto the holder when the baseplate is in the cocked position;
    spring means fastened to the holder and to the baseplate and exerting a force tending to move the baseplate away from the cocked position to the forward position;
    feed legs mounted to the baseplate, which feed legs are positioned, when the baseplate is in the cocked position, for engaging the top sheet on opposite sides of the pin means along a line perpendicular to the direction of said movement of the removing means and which feed legs are positioned, when the baseplate is moving, for engaging the top sheet in a said stack with sufficient force to overcome the force of the pin means; and
    telescoping linking arms coupling the scanning means to the baseplate, so that in response to the movement of the scanning means the baseplate moves into the cocked position during the first portion of the scanning means movement in scanning an answer sheet, and so that the baseplate lip is pulled from the holder in response to the scanning means moving past the point where the scanning of the answer indication areas of the answer sheet is completed, to release the baseplate to move forward in the holder in response to the force of the spring means.

6. A test grading device according to claim 4, further comprising propping means operatively coupled to the removing means for propping the answer sheet removing means apart from the answer sheets during the resetting of the removing means wherein the propping means are positioned for said propping of the removing means, in response to the operation of the removing means in removing a said answer sheet.

7. A test grading device according to claim 4, wherein the answer sheet removing means and the resetting means include a stationary holder;

a baseplate slideably mounted within the stationary holder to move between the cocked and the forward positions, which baseplate contains a lip for retentively hooking onto the holder when the baseplate is in the cocked position;

spring means fastened to the holder and to the baseplate and exerting a force tending to move the baseplate away from the cocked position to the forward position;

feed legs mounted to the baseplate, the feed legs each having a gripping means on one end, which gripping means are positioned to grip an answer sheet when the baseplate is in the cocked position; and telescoping linking arms coupling the scanning means to the baseplate, so that in response to the movement of the scanning means the baseplate moves into the cocked position during the first portion of the scanning means movement in scanning an answer sheet, and so that the baseplate lip is pulled from the holder in response to the scanning means moving past the point where the scanning of the answer indication areas of the answer sheet completed, to release the baseplate to move forward in the holder in response to the force of the spring means.

8. A test grading device according to claim 7 wherein the feed legs are pivotally mounted to the baseplate; and further comprising holding means for forcibly holding the answer sheets in the stationary position; and wherein the pivotal axis of the feed legs is positioned higher than the gripping means and rearward of the gripping means in relation to the direction of movement of the baseplate from the cocked position to the forward position;

whereby when the baseplate moves from the cocked position to the forward position the gripping means grip the gripped answer sheet with a bias force and an additional force which increases in response to the movement of the baseplate until the total gripping force upon the gripped answer sheet overcomes the force of the answer sheet holding means, and which said additional force relaxes in response to the overcoming of the said force of the answer sheet holding means upon the gripped answer sheet.

9. A test grading device according to claim 8 further comprising propping means for propping the answer sheet removing means apart from the answer sheets during the resetting of the removing means;

which propping means include a leg prop pivotally mounted to a feed leg to rest against the remover leg in a position for propping the gripping means from the answer sheets during the cocking of the baseplate; to swing into an inoperative position between the feed legs and the answer sheets when the baseplate is moving to its forward position; and to rest behind and off of the answer sheets when the baseplate is in its cocked position; and wherein the inertia of the feed legs when the baseplate reaches its forward position is such to swing the feed legs sufficiently above the answer sheets to cause the leg prop to swing from its inoperative position to its propping position.

10. A test grading device according to claim 1, wherein the holding means includes pin means for forcibly holding a stack of said answer sheets in a stationary position; and wherein the removing means include movable feed legs which are positioned for movement and for engaging the top sheet in a said stack on opposite sides of the pin means along a line perpendicular to the direction of said movement;

which feed legs, when moving, engage said top sheet with sufficient force to tear said top sheet from said pin means.

11. A test grading device according to claim 1, further comprising delaying means operatively coupled to the scanning means for delaying each actuation of the scoring means until after the completion of scanning of each said corresponding answer indication areas to which the scoring means is responding, wherein the delaying means include strobe mark sensing means operatively coupled to the scanning means for sensing strobe marks positioned in relation to the answer indication areas of the answer sheet and answer key and in relation to the strobe mark sensing means to be sensed by the strobe mark sensing means while the answer indication areas are not being scanned by the scanning means; and enabling means responsive to the sensing of a said strobe mark by the strobe mark sensing means for enabling the actuation of the scoring means only during the sensing of a said strobe mark.

12. A test grading device according to claim 1 further comprising engaging means operatively coupled to the scanning means and responsive to the movement of the scanning means for physically engaging the scanning means with a said answer sheet prior to scanning the first question area of the answer sheet to enable the sensing of answer indications in said answer indication areas of said answer sheet; and disengaging means operatively coupled to the scanning means and responsive to the movement of the scanning means for disengaging the scanning means from said physically engaged answer sheet prior to removing said physically engaged answer sheet from the test grading device to enable the removal of said answer sheet from the test grading device.

13. A test grading device for scoring an answer sheet containing a plurality of answer indication areas for each question, comprising scanning means for scanning the answer indication areas of said answer sheet and the answer indication areas of an answer key, which answer key has answer indication areas corresponding to the answer indication areas of said answer sheet;

answer sheet sensing means operatively coupled to the scanning means for sensing answer indications in said scanned answer indication areas of said answer sheet;

answer key sensing means operatively coupled to the scanning means for sensing answer indications in said scanned answer indication areas of said answer key;

comparing means operatively coupled to the answer sheet sensing means and to the answer key sensing means for comparing answer indications sensed by the answer sheet sensing means with answer indications sensed by the answer key sensing means, which comparing means provide signals indicating agreement or disagreement between said indications sensed from the answer sheet and the answer key;

scoring means operatively coupled to the comparing means for scoring said answer sheet in response to said signals provided by the comparing means; and delaying means operatively coupled to the scanning means for delaying each actuation of the scoring means until after the completion of scanning of each said corresponding answer indication areas to which the scoring means is responding, wherein the delaying means include strobe mark sensing means operatively coupled to the scanning means for sensing strobe marks positioned in relation to the answer indication areas of the answer sheet and answer key and in relation to the strobe mark sensing means to be sensed by the strobe mark sensing means while the answer indication areas are not being scanned by the scanning means; and enabling means responsive to the sensing of a said strobe mark by the strobe mark sensing means for enabling the actuation of the scoring means only during the sensing of a said strobe mark.

14. A test grading device according to claim 13, wherein the answer sheet sensing means and answer key sensing means each include a maintaining means for maintaining answer indication response signals until a time during the sensing of the next strobe mark, which maintaining means include means for providing a first given signal until sensing a mark and a second given signal upon sensing said mark until reset to again provide a first given signal; and which test grading device further comprises resetting means responsive to the sensing of a said strobe mark by the strobe mark sensing means for resetting the maintaining means of the answer sheet sensing means and of the answer key sensing means to provide said first given signals following the sensing of a said strobe mark and before the scanning of the answer indication areas of the next scanned question.

15. A test grading device according to claim 13, wherein the answer sheet sensing means and answer key sensing means each include maintaining means for maintaining answer indication response signals until a time during the sensing of the next sensed strobe mark, which maintaining means of either or both of the answer sheet sensing means and answer key sensing means include an SCR (silicon controlled rectifier) reverse blocking triode thyristor, which is connected to be turned on in response to the sensing of a predetermined answer indication in an answer indication area.

16. A test grading device according to claim 2, in which the answer sheet sensing means and answer key sensing means each include maintaining means for maintaining answer indication response signals until a time during the sensing of the next sensed strobe mark, and in which either or both of the answer sheet sensing means and answer key sensing means are capable of conducting to the scoring means an answer indication response signal of sufficient magnitude to actuate the scoring means without the necessity of intermediate current amplification, wherein an SCR (silicon controlled rectifier) reverse blocking triode thyristor provides the maintenance of the said answer indication response signal and provides the capability of the sensing means to conduct to the scoring means an answer indication response signal of sufficient magnitude to actuate the scoring means without the necessity of intermediate current amplification, which SCR is connected to be turned on in response to the sensing of a predetermined answer indication in an answer indication area.

17. A test grading device according to claim 13 wherein a corresponding pair of answer sheet and answer key sensing means comprise in combination a pair of photocells positioned to scan a corresponding pair of answer indication areas and connected between a first voltage potential source and ground; and a pair of SCR (silicon controlled rectifier) reverse blocking triode thyristors, the gate of each SCR being connected to a contact of a different photocell which contact is connected to the first voltage potential source, the cathode of each SCR being connected to ground, and the anode of each SCR being connected to a second voltage potential source.

18. A test grading device according to claim 17 in which the comparing means comprise a reed switch connected to a corresponding pair of answer sheet sensing means and answer key sensing means wherein the coil of the reed switch is connected between the respective anodes of the corresponding SCRs.

19. A test grading device for automatically scoring a plurality of stationary answer sheets, each answer sheet containing a plurality of answer indication areas for each question, comprising movable scanning means for scanning the answer indication areas of a said answer sheet and the answer indication areas of an answer key, which answer key has answer indication areas corresponding to the answer indication areas of each said answer sheet;

answer sheet sensing means operatively coupled to the movable scanning means for sensing answer indications in said scanned answer indication areas of each said answer sheet;

answer key sensing means operatively coupled to the movable scanning means for sensing answer indications in said scanned answer indication areas of said answer key;

comparing means operatively coupled to the answer sheet sensing means and to the answer key sensing means for comparing the answer indications sensed by the answer sheet sensing means with the answer indications sensed by the answer key sensing means, which comparing means provide signals indicating agreement or disagreement between the indications sensed from the answer sheet and the answer key;

scoring means operatively coupled to the comparing means for each said answer sheet in response to said signals provided by the comparing means;

removing means operatively coupled to the scanning means for removing from the test grading device each answer sheet, the scanning of the answer indication areas of which has been completed; and holding means for forcibly holding a stack of said answer sheets in a stationary position;

which removing means comprise moveable means which, when moving, engage the top sheet in a said stack with sufficient force to overcome the force of the holding means;

which movable means comprise feed legs which are positioned for engaging the top answer sheet on opposite sides of the holding means along a line perpendicular to the direction of said movement of the removing means.

20. A test grading device for scoring an answer sheet containing a plurality of answer indication areas for each question, comprising scanning means for scanning the answer indication areas of said answer sheet and the answer indication areas of an answer key, which answer key has answer indication areas corresponding to the answer indication areas of said answer sheet;

answer sheet sensing means operatively coupled to the scanning means for sensing answer indications in said scanned answer indication areas of said answer sheet;

answer key sensing means operatively coupled to the scanning means for sensing the answer indications in said scanned answer indication areas of said answer key;

comparing means operatively coupled to the answer sheet sensing means and to the answer key sensing means for comparing answer indications sensed by the answer sheet sensing means with answer indications sensed by the answer key sensing means, which comparing means provide signals indicating agreement or disagreement between said indications sensed from the answer sheet and the answer key;

scoring means operatively coupled to the comparing means for scoring said answer sheet, in which either or both of the answer sheet sensing means and the answer key sensing means are capable of conducting to the scoring means an answer indication response signal of sufficient magnitude to actuate the scoring means without the necessity of intermediate current amplification,
wherein either or both of said sensing means include an SCR (silicon controlled rectifier) reverse blocking triode thyristor, which is connected to be turned on in response to the sensing of a predetermined answer indication in an answer indication area.

21. A test grading device for scoring an answer sheet containing a plurality of answer indication areas for each question, comprising scanning means for scanning the answer indication areas of the answer sheet and the answer indication areas of an answer key, which answer key has answer indication areas corresponding to the answer indication areas of the answer sheet;

answer sheet sensing means operatively coupled to the scanning means for sensing the answer indications in the scanned answer indication areas of the answer sheet;

answer key sensing means operatively coupled to the scanning means for sensing the answer indications in the scanned answer indication areas of the answer key;

comparing means for comparing the answer indications sensed by the answer sheet sensing means with the answer indications sensed by the answer key sensing means, which comparing means provide signals indicating agreement or disagreement between the indications sensed from the answer sheet and the answer key;

scoring means responsive to the signals provided by the comparing means for scoring the answer sheet; and wherein a corresponding pair of answer sheet and answer key sensing means and corresponding comparing means in combination comprise a pair of photocells positioned to scan a corresponding pair of answer indication areas, and connected between a first voltage potential source and ground;

a pair of SCR (silicon controlled rectifier) reverse blocking triode thyristors, the gate of each SCR being connected to a contact of a different photocell which contact is connected to the first voltage potential source, the cathode of each SCR being connected to ground, and the anode of each SCR being connected to a second voltage potential source; and a reed switch having its coil connected between the anodes of the two SCRs.

UNITED STATES PATENT OFFICE
CERTIFICATE OF CORRECTION

Patent No. 3,601,906　　　　　　　　　　Dated　August 31, 1971

Inventor(s)　John L. Roche

It is certified that error appears in the above-identified patent and that said Letters Patent are hereby corrected as shown below:

Column 1, line 14, change "desirably" to -- desirable --;

line 20, change "desirably" to -- desirable --.

Column 5, line 52, change "and" to -- to --.

Column 7, line 12, after "another" insert -- answer --.

Column 8, line 48, change "resets" to -- rests --.

Column 10, line 16, change "and", second occurrence to -- or --.

Column 14, line 34, change "18a" to -- 18 --; and line 54, after "'1'", insert -- pulse --.

Column 17, line 1, change "and" to -- or --; and line 3, change "coupled" (first occurrence) to -- coil --.

Column 21, line 36, after "sheet" insert -- is --.

Column 23, line 43, change "2" to -- 13 --.

Signed and sealed this 3rd day of October 1972.

(SEAL)
Attest:

EDWARD M. FLETCHER, JR.　　　　　　　　ROBERT GOTTSCHALK
Attesting Officer　　　　　　　　　　　Commissioner of Patents